(12) United States Patent
Li et al.

(10) Patent No.: US 12,501,572 B2
(45) Date of Patent: Dec. 16, 2025

(54) PULL-OUT HARD DISK BRACKET AND METHOD FOR FIXING HARD DISK THEREWITH

(71) Applicant: Suzhou MetaBrain Intelligent Technology Co., Ltd., Jiangsu (CN)

(72) Inventors: Xiaozheng Li, Jiangsu (CN); Xiuzhong Yin, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 19/115,220

(22) PCT Filed: Mar. 29, 2024

(86) PCT No.: PCT/CN2024/084652
§ 371 (c)(1),
(2) Date: Mar. 25, 2025

(87) PCT Pub. No.: WO2025/025643
PCT Pub. Date: Feb. 6, 2025

(65) Prior Publication Data
US 2025/0261327 A1     Aug. 14, 2025

(30) Foreign Application Priority Data
Aug. 1, 2023 (CN) .......................... 202310956675.2

(51) Int. Cl.
*H05K 7/14* (2006.01)
*G06F 1/18* (2006.01)
*H05K 5/02* (2006.01)

(52) U.S. Cl.
CPC .......... *H05K 7/1489* (2013.01); *G06F 1/187* (2013.01)

(58) Field of Classification Search
CPC .............................. H05K 7/1489; G06F 1/187
See application file for complete search history.

(56) References Cited

U.S. PATENT DOCUMENTS 5,262,923 A * 11/1993 Batta ....................... G06F 1/184
439/948
5,653,518 A *  8/1997 Hardt ..................... G11B 33/128
(Continued)

FOREIGN PATENT DOCUMENTS

| CN | 201616270 U | 10/2010 |
| CN | 207624377 U | 7/2018 |

(Continued)

OTHER PUBLICATIONS

International Search Report of corresponding PCT application (PCT/CN2024/084652), mailed Jul. 2, 2024, 8 pages.
(Continued)

Primary Examiner — Kimberley S Wright
(74) Attorney, Agent, or Firm — Cooper Legal Group, LLC

(57) ABSTRACT

A pull-out hard disk bracket for server chassis is disclosed, comprising two partition plate modules arranged in mirror symmetry to fix a hard disk therebetween. The partition plate module each includes a partition plate and a sliding rail, wherein the sliding rails of the two partition plate modules may open to a certain angle to install/remove the hard disk between the two partition plate modules.

20 Claims, 11 Drawing Sheets

(56) References Cited

U.S. PATENT DOCUMENTS

| | | | | |
|---|---|---|---|---|
| 5,683,159 | A * | 11/1997 | Johnson | G06F 1/187 |
| | | | | 312/334.7 |
| 6,370,022 | B1 * | 4/2002 | Hooper | G06F 1/184 |
| | | | | 361/679.33 |
| 6,464,085 | B1 * | 10/2002 | Chin | G11B 33/128 |
| 6,619,977 | B1 * | 9/2003 | Chen | G06F 1/187 |
| | | | | 439/358 |
| 6,654,240 | B1 * | 11/2003 | Tseng | G06F 1/184 |
| | | | | 361/679.33 |
| 2005/0007732 | A1 * | 1/2005 | Hsu | G06F 1/184 |
| | | | | 361/679.38 |
| 2005/0128697 | A1 * | 6/2005 | Su | G06F 1/184 |
| | | | | 312/223.1 |
| 2007/0035920 | A1 * | 2/2007 | Peng | G06F 1/187 |
| | | | | 361/679.31 |
| 2009/0141457 | A1 * | 6/2009 | Fujikawa | G11B 33/12 |
| | | | | 361/727 |

FOREIGN PATENT DOCUMENTS

| | | |
|---|---|---|
| CN | 108958386 A | 12/2018 |
| CN | 208314686 U | 1/2019 |
| CN | 109901676 A | 6/2019 |
| CN | 208987227 U | 6/2019 |
| CN | 209693281 U | 11/2019 |
| CN | 211375510 U | 8/2020 |
| CN | 211742000 U | 10/2020 |
| CN | 113534364 A | 10/2021 |
| CN | 115543038 A | 12/2022 |
| CN | 218957116 U | 5/2023 |
| CN | 116339452 A | 6/2023 |
| CN | 116661566 A | 8/2023 |
| FR | 2904126 A3 | 1/2008 |

OTHER PUBLICATIONS

Written Opinion of International Searching Authority of corresponding PCT application (PCT/CN2024/084652), mailed Jul. 2, 2024, 8 pages.

Notification to Grant Patent Right for Invention of corresponding CN priority application (CN202310956675.2), mailed Sep. 5, 2023, 3 pages.

* cited by examiner

PULL-OUT HARD DISK BRACKET AND METHOD FOR FIXING HARD DISK THEREWITH

CROSS-REFERENCE TO RELATED APPLICATION

This application claims priority to Chinese Patent Application No. 202310956675.2, filed on Aug. 1, 2023 in China National Intellectual Property Administration and entitled "PULL-OUT HARD DISK BRACKET AND METHOD FOR FIXING HARD DISK THEREWITH", which is hereby incorporated by reference in its entirety.

FIELD

The present application relates to the technical field of servers, and in particular to a pull-out hard disk bracket and a method for fixing a hard disk therewith.

BACKGROUND

Pre-server maintenance of hard disks on the market today is usually assembled from a complex hard disk bracket. When maintaining and replacing hard disks, it is necessary to first assemble the hard disk into the bracket and then install it into the server. The bracket is costly and complicated to assemble. Also, there is a single hard disk installation method, but the hard disk sliding rail is easy to be lost when shipped in the form of an accessory package, and the assembly is cumbersome. Thus, it is necessary to first assemble the hard disk and the sliding rail into a module and then installed in the chassis. Moreover, the sliding rails of the relevant hard disk bracket are arranged in parallel at two sides, and cannot be opened at a certain angle. It is difficult to install and detach the hard disk between the sliding rails of the two brackets, and it is impossible to install the sliding rails first and then install the hard disk.

SUMMARY

A pull-out hard disk bracket and a method for fixing a hard disk therewith are provided.

In an aspect, a pull-out hard disk bracket is provided, which is used for slidably fixing a hard disk on a chassis support. The pull-out hard disk bracket includes two partition plate modules arranged in mirror symmetry, and the hard disk can be detachably clamped and fixed between the two partition plate modules;

each partition plate module includes a partition plate and a sliding rail; the partition plate is provided with a partition plate body, a sliding rail guide slot and an elastic wall sliding slot; the sliding rail guide slot is arranged along the extension direction of the partition plate body; the elastic wall sliding slot is located on an axis of symmetry of the sliding rail guide slot; the sliding rail is provided with a sliding rail body, a sliding wall, a hard disk fixing structure and an elastic wall; the sliding rail body is provided with an inner end, an outer end, an upper side wall and a lower side wall; the sliding wall is located on the upper side wall and the lower side wall of the sliding rail body and is slidably connected to the sliding rail guide slot; the hard disk fixing structure is provided on a side of the sliding rail body facing away from the partition plate body for clamping and fixing the hard disk; the elastic wall is provided on one side of the inner end of the sliding rail body, and the elastic wall can be slidingly clamped in the elastic wall sliding slot;

wherein an end of the sliding wall adjacent to one side of the elastic wall is provided with a guiding slope; when the elastic wall is located at one side of the outer end of the partition plate body, the elastic wall abuts against the outer end located at an end of the elastic wall sliding slot; the elastic wall is located in the elastic wall sliding slot; the sliding wall is kept to be located in the sliding rail guide slot, whereby the sliding rail is mounted on the partition plate; the sliding wall can drive the sliding rail body to rotate towards one side of the partition plate body by the abutment of the guiding slope with the sliding rail guide slot by a first angle; and a second angle is opened between the sliding rails of the two partition plate modules so as to fix or detach the hard disk between the two partition plate modules.

In one or more embodiments, the second angle is equal to twice the first angle.

In one or more embodiments, the sliding rail is made of a flexible resilient material and the second angle is greater than or equal to twice the first angle.

In one or more embodiments, the first angle is in the range of 5 degrees to 20 degrees.

In one or more embodiments, the inner end of the sliding rail body has a wedge-shaped structure; a flipping slope is provided at a side of the inner end of the sliding rail body facing towards the partition plate body; and the angle of the flipping slope with respect to the extension plane of the sliding rail body is a third angle which is greater than or equal to the first angle.

In one or more embodiments, a hollowed-out groove is provided at the inner end of the sliding rail body; the elastic wall is located in the hollowed-out groove and is connected to the inner end of the sliding rail body; and a side of the elastic wall facing towards the partition plate body protrudes beyond a surface of a side wall of the sliding rail body.

In one or more embodiments, when the sliding rail is mounted on the partition plate, the sliding wall is clamped with the sliding rail guide slot and slides relative to each other; the elastic wall is pressed and deformed with the partition plate body until the elastic wall is accommodated and clamped in the elastic wall sliding slot, and the elastic wall is elastically recovered;

when the sliding rail is detached from the partition plate, the sliding wall slides relative to the sliding rail guide slot; the elastic wall is disengaged from the elastic wall sliding slot; and the elastic wall is pressed and deformed with the partition plate body until the sliding wall is disengaged from the sliding rail guide slot, and the elastic wall is elastically recovered.

In one or more embodiments, the inner end of the sliding rail body has an upper side wall and a lower side wall at a side facing away from the outer end that are gradually reduced in width.

In one or more embodiments, the sliding rail guide slot includes at least one flap guide slot formed by two oppositely disposed L-shaped flaps stamped and formed from the partition plate body.

In one or more embodiments, the sliding rail guide slot includes two flap guide slots located at the inner and outer ends of the sliding rail body, respectively.

In one or more embodiments, a thickness value of the sliding wall is equal to a bending width value of the L-shaped flap; and the sliding wall protrudes from upper and lower side wall surfaces of the sliding rail body and is slidably clamped with the L-shaped flap.

In one or more embodiments, a sliding rail limit structure is further arranged at the position of the inner end of the sliding rail body; the sliding rail limit structure is arranged corresponding to the elastic wall sliding slot;

when the elastic wall is located at a side of the inner end of the partition plate body, the elastic wall abuts against the outer end located at the end of the elastic wall sliding slot; the elastic wall is located within the elastic wall sliding slot; and the inner end of the sliding rail body abuts against a sliding rail limit structure.

In one or more embodiments, the partition plate body is provided with a plurality of mounting holes adapted to pass through fasteners to fixedly connect the partition plate body to the chassis support.

In one or more embodiments, a sliding rail locking piece is arranged at the outer end of the sliding rail body, and the partition plate body is provided with a lock sliding rail notch; and the sliding rail locking piece is snapped into the lock sliding rail notch when the elastic wall is located at a side of the inner end of the partition plate body.

In one or more embodiments, a press unlocking piece is further provided at the outer end of the sliding rail body; the press unlocking piece is connected to the sliding rail locking piece; and when the press unlocking piece is pressed, the sliding rail locking piece is capable of being driven to be disengaged from the lock sliding rail notch.

In one or more embodiments, the press unlocking piece includes a finger press plate which is connected to the sliding rail locking piece; and an anti-slip unlocking pattern is arranged on the finger press plate.

In one or more embodiments, the hard disk is received in an engagement slot formed in the chassis support when the elastic wall is located at a side of the inner end of the partition plate body; and the finger press plate protrudes out of the engagement slot formed in the chassis support.

In one or more embodiments, the hard disk fixing structure includes a fixing post; the side wall of the hard disk is provided with a clamping hole; and the fixing post is capable of being clamped in the clamping hole.

In one or more embodiments, when the sliding rails of the two partition plate modules are arranged in parallel, the spacing between the two sliding rail bodies is equal to the width value of the hard disk.

In one or more embodiments, a sliding rail limit structure is further arranged at the position of the inner end of the sliding rail body; the sliding rail limit structure is arranged corresponding to the elastic wall sliding slot;

a sliding rail locking piece is arranged at an outer end of the sliding rail body, and the partition plate body is provided with a lock sliding rail notch; and a light guide post is further provided at at least one side of the sliding rail body facing towards the partition plate body.

The present application also provides a method for fixing a hard disk using the above-mentioned pull-out hard disk bracket, including:

mounting two partition plates on the chassis support in a mirror symmetry manner;

mounting two sliding rail in mirroring on the two partition plates correspondingly to form two partition plate modules which are arranged in mirror symmetry, wherein when the sliding rail is mounted on the partition plate, the sliding wall is clamped with the sliding rail guide slot and slides relative to each other; the elastic wall is pressed and deformed with the partition plate body until the elastic wall is accommodated and clamped in the elastic wall sliding slot, and the elastic wall is elastically recovered;

when the elastic wall is kept to be located at one side of the outer end of the partition plate body, abutting the elastic wall against the outer end located at an end of the elastic wall sliding slot, wherein the elastic wall is located in the elastic wall sliding slot; the sliding wall is kept to be located in the sliding rail guide slot, whereby the sliding rail is mounted on the partition plate; the sliding wall drives the sliding rail body to rotate towards one side of the partition plate body by the abutment of the guiding slope with the sliding rail guide slot by a first angle; a second angle is opened between the sliding rails of the two partition plate modules to accommodate a hard disk;

detachably clamping both sides of the hard disk on the two sliding rails via the hard disk fixing structure, wherein each sliding rail is rotated by a first angle, whereby the two sliding rails are arranged in parallel on the both sides of the hard disk; and the hard disk is pushed into and fixed in the chassis support via the two partition plate modules.

In one or more embodiments, the method for fixing a hard disk using the pull-out hard disk bracket further includes:

pulling the hard disk out from the chassis support via the two partition plate modules, wherein when the elastic wall is kept to be located at one side of the outer end of the partition plate body, the elastic wall abuts against the outer end located at an end of the elastic wall sliding slot; the elastic wall is located in the elastic wall sliding slot; the sliding wall is kept to be located in the sliding rail guide slot, whereby the sliding rail is mounted on the partition plate; and separating two sliding rails at both sides of the hard disk towards a side facing away from the hard disk, separating the hard disk fixing structure from the hard disk, wherein the sliding wall drives the sliding rail body to rotate at a first angle towards a side of the partition plate body by abutting the guiding slope against the sliding rail guide slot, and a second angle is opened between the sliding rails of the two partition plate modules so as to facilitate the disassembly of the hard disk between the two partition plate modules.

In one or more embodiments, the method for fixing a hard disk using the pull-out hard disk bracket further includes:

removing the sliding rail from the partition plate, wherein when the sliding rail is detached from the partition plate, the sliding wall slides relative to the sliding rail guide slot; the elastic wall is disengaged from the elastic wall sliding slot; and the elastic wall is pressed and deformed with the partition plate body until the sliding wall is disengaged from the sliding rail guide slot, and the elastic wall is elastically recovered.

BRIEF DESCRIPTION OF THE DRAWINGS

In order to explain the technical solutions in the embodiments of the present application more clearly, the following will briefly introduce the drawings required to be used in the description of the embodiments. It is obvious that the drawings in the following description are only some embodiments of the present application, and it would have been obvious for a person of ordinary skill in the art to obtain other drawings according to these drawings without involving any inventive effort.

Figure 1:
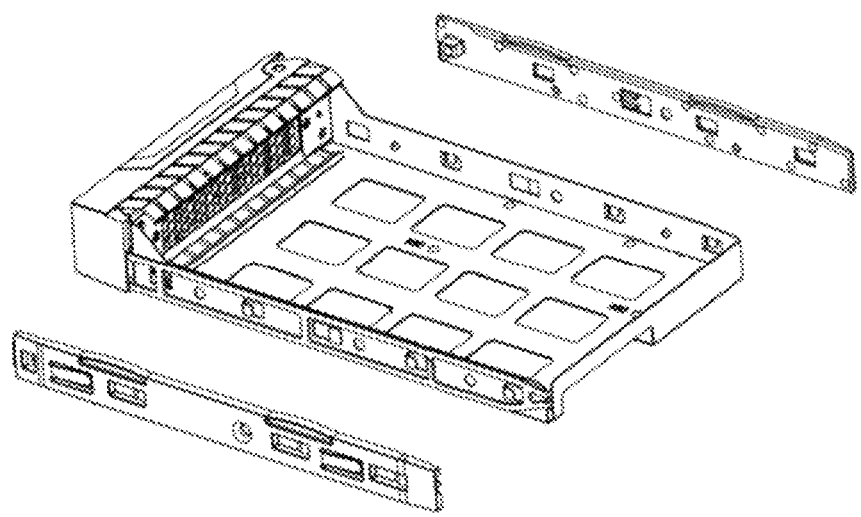
FIG. 1 is a structurally schematic view of a hard disk and a sliding rail are assembled into a module for mounting in a hard disk bracket in a chassis in the related art.
Figure 2:
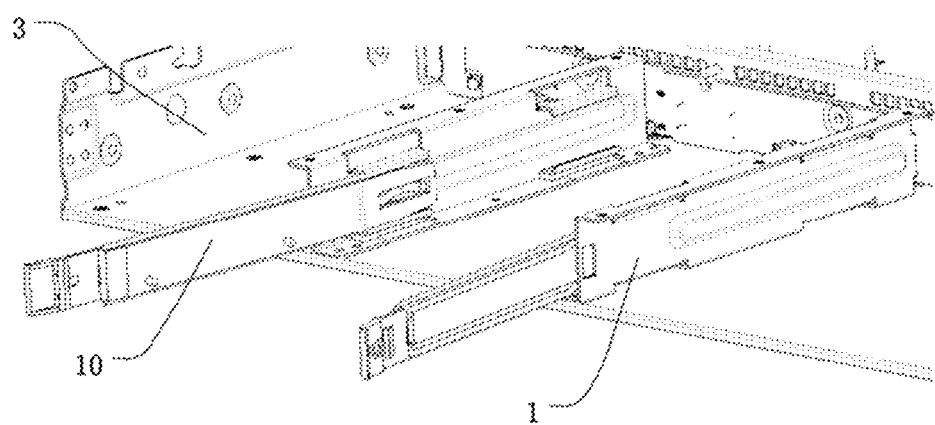
FIG. 2 is a structurally perspective view of a pull-out hard disk bracket according to an embodiment of the present application.
Figure 3:
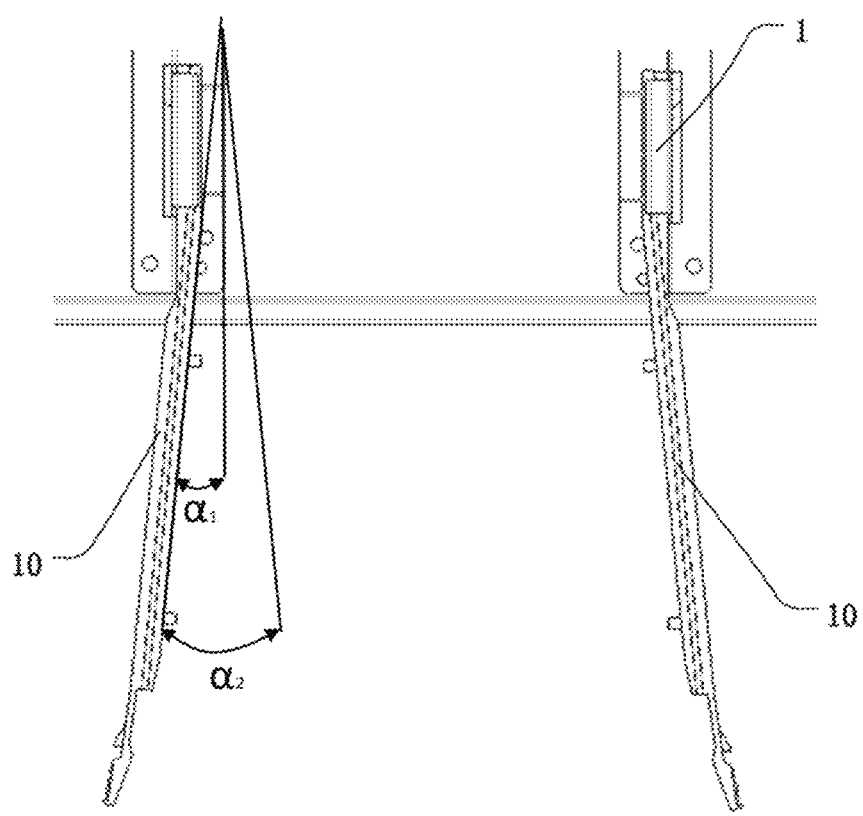
FIG. 3 is a top view of a pull-out hard disk bracket according to an embodiment of the present application.
Figure 4:
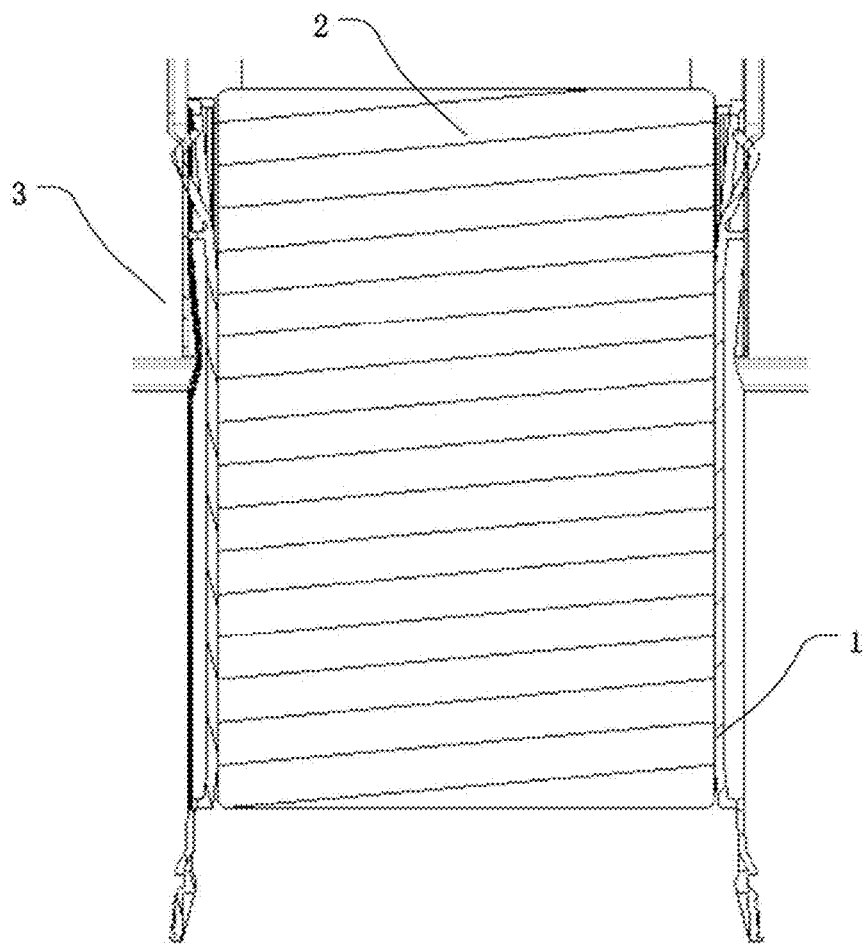
FIG. 4 is a top view of a pull-out hard disk bracket for detachably clamping and fixing a hard disk according to an embodiment of the present application.
Figure 5:
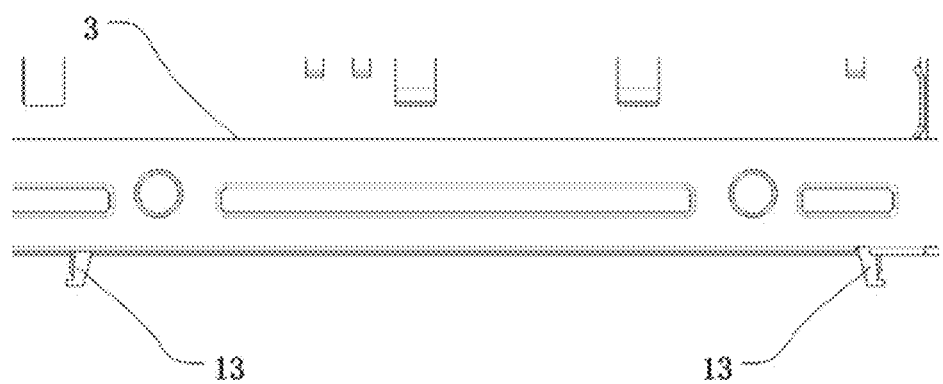
FIG. 5 is a top view of a pull-out hard disk bracket securing a hard disk to a chassis support according to an embodiment of the present application.

The reference numerals in the drawings are as follows:

pull-out hard disk bracket 1, partition plate module 10, partition plate 11, partition plate body 111, sliding rail guide slot 112, elastic wall sliding slot 113, flap guide slot 114, L-shaped flap 115, mounting hole 116, lock sliding rail notch 117, sliding rail 12, sliding rail body 121, sliding wall 122, hard disk fixing structure 123, elastic wall 124, guiding slope 125, flipping slope 126, light guide post 127, hollowed-out groove 128, sliding rail locking piece 129, press unlocking piece 13, finger press plate 131, anti-slip unlocking pattern 132, sliding rail limit structure 14, hard disk 2, and chassis support 3.

DETAILED DESCRIPTION

In order that the objects, aspects, and advantages of the present application may be more clearly understood, a more particular description of the present application will be rendered by reference to the appended drawings and embodiments. It should be understood that the specific embodiments described herein are for purposes of illustration only and are not intended to be limiting.

As shown in FIG. 1, the sliding rails of the relevant hard disk bracket are arranged in parallel at two sides, and cannot be opened at a certain angle. It is difficult to install and detach the hard disk between the sliding rails of the two brackets, and it is impossible to install the sliding rails first and then install the hard disk. This leads to the need to assemble the hard disk and the sliding rail into a module firstly and the same to the chassis in order to install the hard disk on the bracket. To remove and replace the hard disk, the hard disk bracket in the bracket is required to be removed as a whole, whereby it is possible to remove the hard disk, resulting in that a single hard disk cannot be quickly mounted and detached.

In one or more embodiments, as shown in FIGS. 2, 3, 4, and 5, a pull-out hard disk bracket 1 is provided for slidably fixing a hard disk 2 to a chassis support 3. The pull-out hard disk bracket 1 includes two partition plate modules 10 arranged in mirror symmetry, and the hard disk 2 can be detachably clamped and fixed between the two partition plate modules 10.

Figure 6:
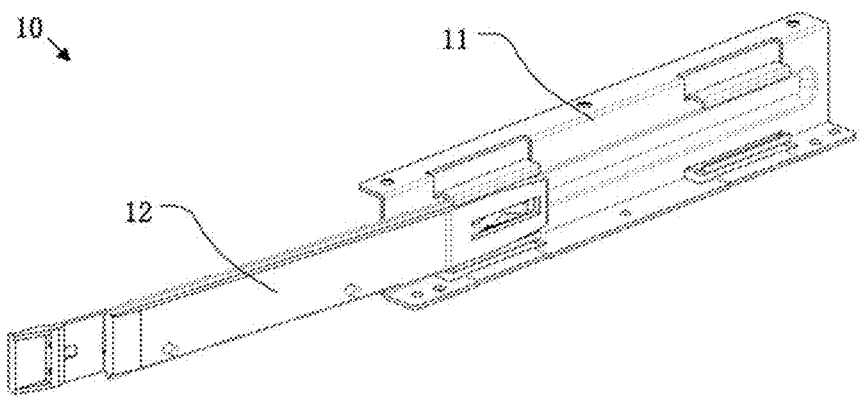
FIG. 6 is a structurally schematic view of a partition plate module provided on the left side of a hard disk in a stretched state according to an embodiment of the present application.
Figure 7:
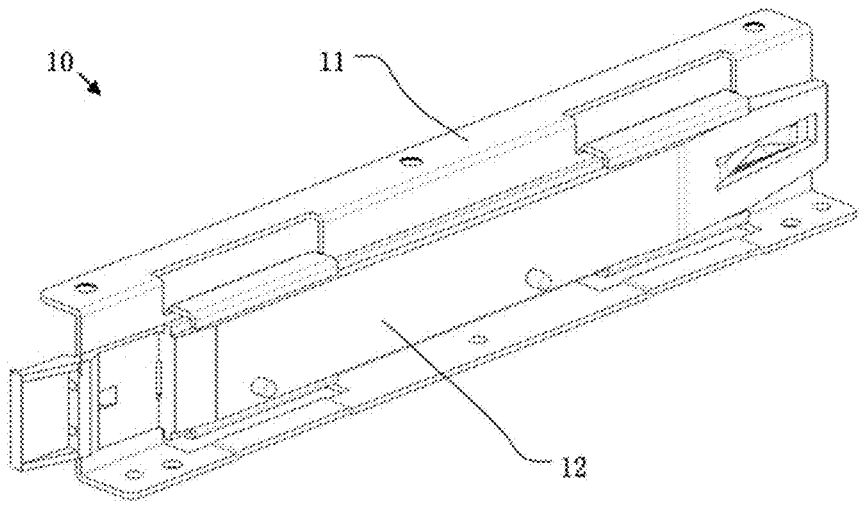
FIG. 7 is a structurally schematic view of a partition plate module provided on the left side of the hard disk in a contraction state according to an embodiment of the present application.
Figure 11:
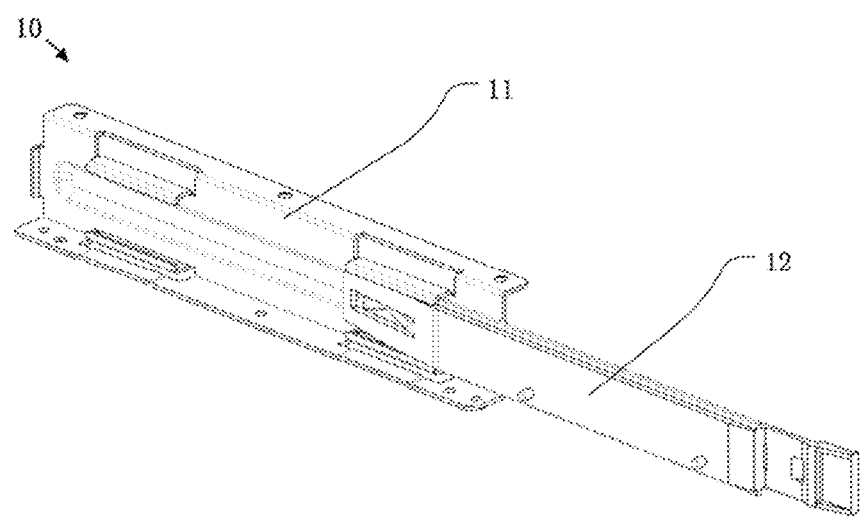
FIG. 11 is a structurally schematic view of a partition plate module arranged on the right side of the hard disk in a stretched state according to an embodiment of the present application.
Figure 12:
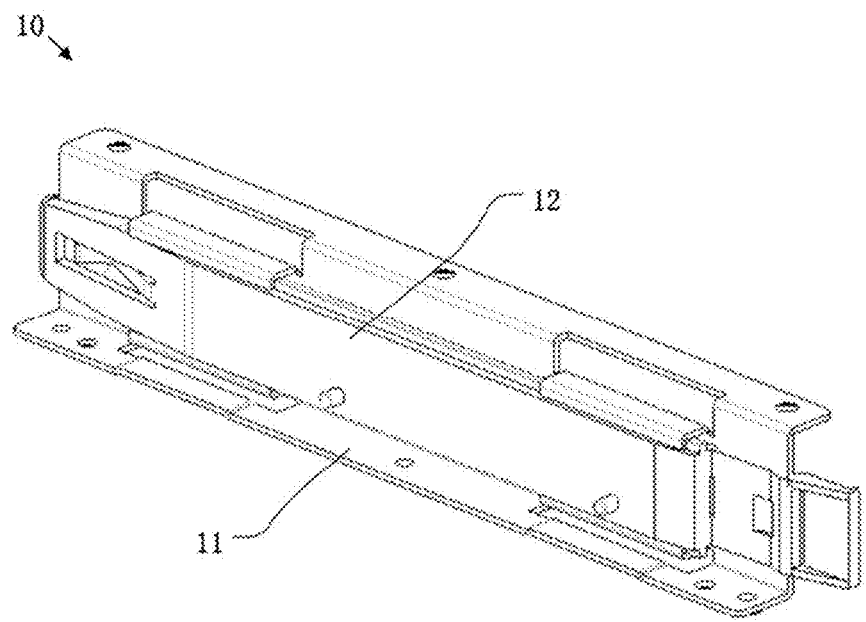
FIG. 12 is a structurally schematic view of a partition plate module provided on the right side of the hard disk in a contraction state according to an embodiment of the present application.

It can be understood that, as shown in FIGS. 6, 7, 11 and 12, the hard disk 2 is detachably fixed by one partition plate module 10 on the left side and one partition plate module 10 on the right side on both sides of the hard disk 2, respectively, whereby the hard disk 2 can be clamped with the pull-out hard disk bracket 1. Herein, one partition plate module 10 on the left side is arranged in mirror symmetry with one partition plate module 10 on the right side, and the distance between the two partition plate modules 10 is equal to the width of the hard disk 2, whereby the hard disk 2 can be clamped exactly. Herein, FIG. 6 is a structurally schematic view of a partition plate module 10 provided on the left side of a hard disk 2 in a stretched state according to an embodiment of the present application. FIG. 7 is a structurally schematic view of a partition plate module 10 provided on the left side of the hard disk 2 in a contraction state according to an embodiment of the present application. FIG. 11 is a structurally schematic view of a partition plate module 10 arranged on the right side of a hard disk 2 in a stretched state according to an embodiment of the present application. FIG. 12 is a structurally schematic view of a partition plate module 10 provided on the right side of the hard disk 2 in a contraction state according to an embodiment of the present application.

Figure 8:
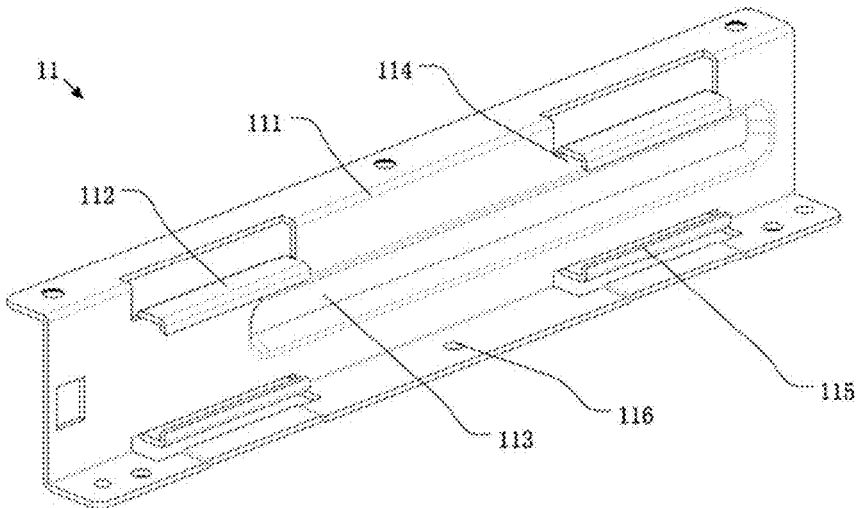
FIG. 8 is a structurally schematic view of a partition plate of a partition plate module provided on the left side of the hard disk according to an embodiment of the present application.
Figure 9:
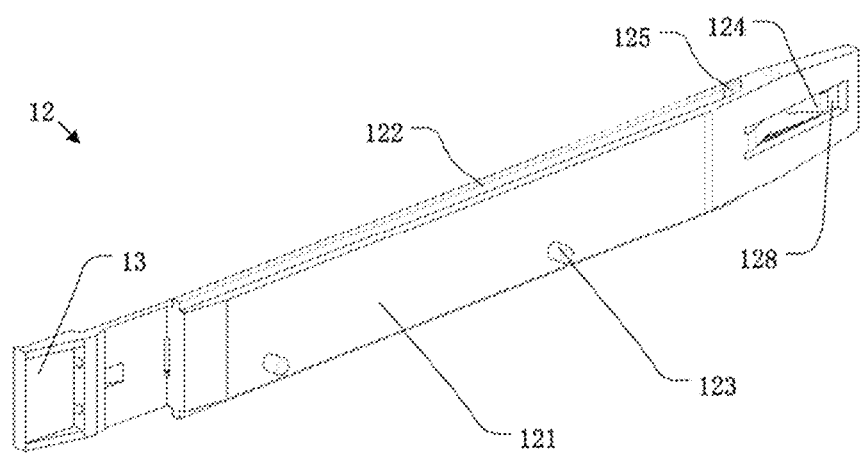
FIG. 9 is a first perspective structural diagram of a sliding rail of a partition plate module provided on the left side of the hard disk according to an embodiment of the present application.
Figure 10:
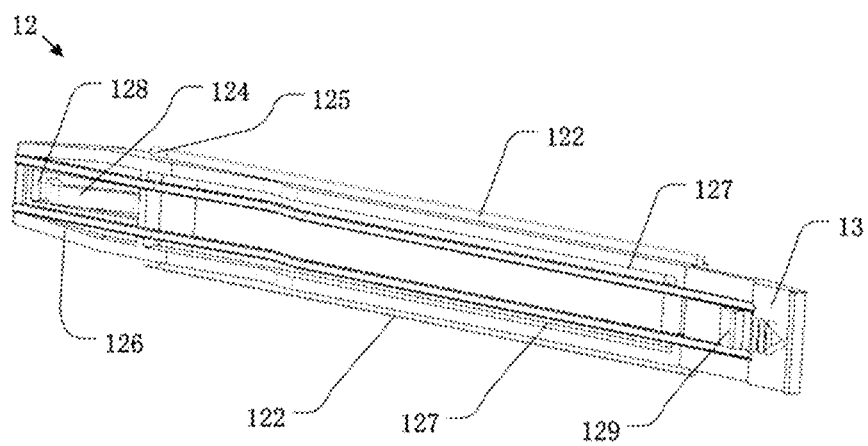
FIG. 10 is a second perspective structural diagram of a sliding rail of a partition plate module provided on the left side of the hard disk according to an embodiment of the present application.
Figure 13:
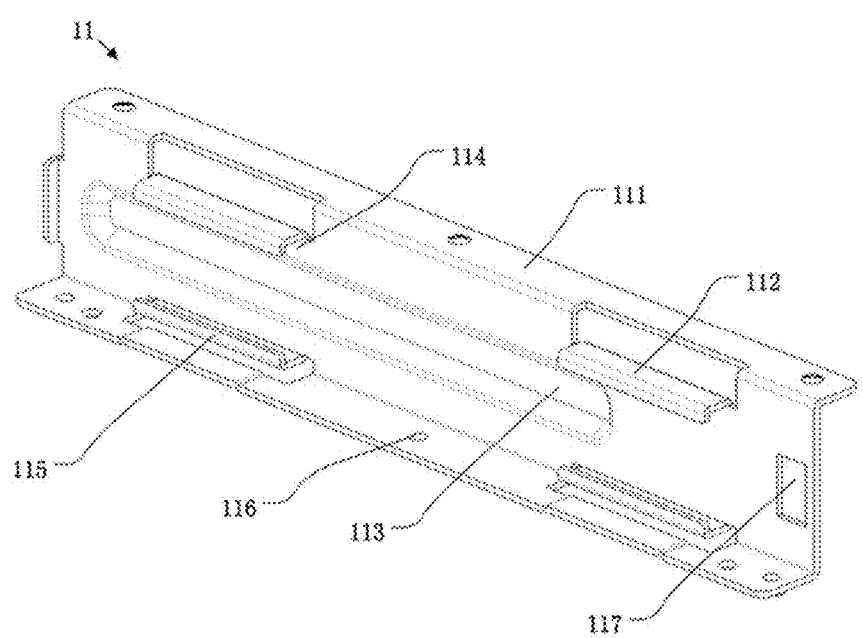
FIG. 13 is a structurally schematic view of a partition plate of a partition plate module provided on the right side of the hard disk according to an embodiment of the present application.
Figure 14:
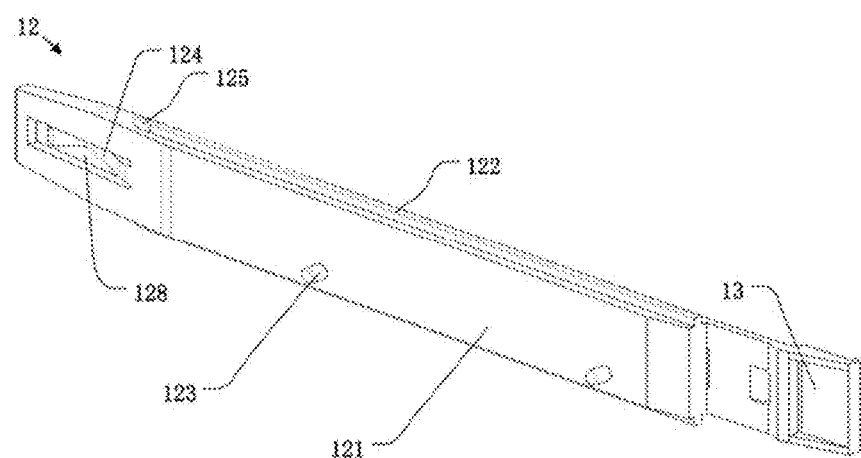
FIG. 14 is a first perspective structural diagram of a sliding rail of a partition plate module provided on the right side of the hard disk according to an embodiment of the present application.
Figure 15:
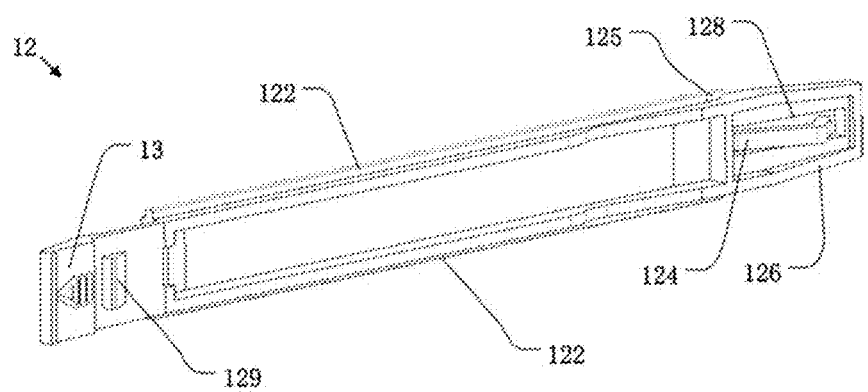
FIG. 15 is a second perspective structural diagram of a sliding rail of a partition plate module arranged on the right side of the hard disk according to an embodiment of the present application.

As shown in FIGS. 8, 9, 10, 13, 14 and 15, FIG. 8 is a structurally schematic view of a partition plate 11 of a partition plate module 10 provided on the left side of the hard disk according to an embodiment of the present application. FIGS. 9 and 10 are structurally schematic views of a sliding rail 12 of a partition plate module 10 provided on the left side of the hard disk 2 according to an embodiment of the present application. FIG. 13 is a structurally schematic view of a partition plate 11 of a partition plate module 10 provided on the right side of a hard disk 2 according to an embodiment of the present application. FIG. 14 and FIG. 15 are structurally schematic views of a sliding rail 12 of a partition plate module 10 provided on the right side of the hard disk 2 according to an embodiment of the present application.

Herein, each partition plate module 10 includes a partition plate 11 and a sliding rail 12. The partition plate 11 is provided with a partition plate body 111, a sliding rail guide slot 112 and an elastic wall sliding slot 113. The sliding rail guide slot 112 is arranged along the extension direction of the partition plate body 111. The elastic wall sliding slot 113 is located on an axis of symmetry of the sliding rail guide slot 112. The sliding rail 12 is provided with a sliding rail body 121, a sliding wall 122, a hard disk fixing structure 123 and an elastic wall 124. The sliding rail body 121 is provided with an inner end, an outer end, an upper side wall and a lower side wall. The sliding wall 122 is located on the upper side wall and the lower side wall of the sliding rail body 121 and is slidably connected to the sliding rail guide slot 112. The hard disk fixing structure 123 is provided on a side of the sliding rail body 121 facing away from the partition plate body 111 for clamping and fixing the hard disk 2. The elastic wall 124 is provided on a side of the inner end of the sliding rail body 121, and one end of the elastic wall 124 is connected in the elastic wall sliding slot 113.

Therewith, both sides of the hard disk 2 are clamped on the sliding rail 12, and the sliding rail 12 can slide along the partition plate 11, whereby detachable clamping and fixing of the partition plate module 10 and the hard disk 2 can be realized. When the two partition plates 11 are mounted on the chassis support 3, fixing or dismounting of the hard disk 2 on the chassis support 3 can be realized by means of pulling and pulling the hard disk 2. A sliding rail guide slot 112 and a sliding wall 122 which are in relative sliding fit are provided between the sliding rail 12 and the sliding plate 11 to achieve relative sliding of the two, so as to achieve that the structure of the sliding plate module 10 in the present application is simple, and a stable clamping connection between the sliding plate 11 and the sliding rail 12 can be achieved by means of the fitting of the elastic wall sliding slot 113 and the elastic wall 124, thus ensuring the stability of the structure.

As shown in FIGS. 9, 10, 14 and 15, the end of the sliding wall 122 adjacent to one side of the elastic wall 124 is provided with a guiding slope 125. When the elastic wall 124 is located at a side of the outer end of the partition plate body 111, the elastic wall 124 abuts against an end of the elastic wall sliding slot 113, and the sliding wall 122 can move the sliding rail body 121 to rotate by a first angle $\alpha_1$ towards a side of the partition plate body 111 by abutting the guiding slope 125 against the sliding rail guide slot 112, and expand by a second angle $\alpha_2$ between the sliding rails 12 of the two partition plate modules 10 so as to fix or detach the hard disk 2 between the two partition plate modules 10.

In the present embodiment, the guiding slope 125 is provided at the end of the sliding wall 122 adjacent to the side of the elastic wall 124, whereby the sliding wall 122 can rotate the sliding rail body 121 towards the side of the partition plate body 111 by the abutment of the guiding slope 125 with the sliding rail guide slot 112 by a first angle $\alpha_1$, and expand between the sliding rails 12 of the two partition plate modules 10 by a second angle $\alpha_2$ so as to fix or detach the hard disk 2 between the two partition plate modules 10. By means of pulling the hard disk 2, it is achieved that the sliding rails 12 of the two partition plate modules 10 can be movably opened to realize the quick installation and removal of the single hard disk 2.

In the present embodiment, the second angle $\alpha_2$ is equal to twice the first angle $\alpha_1$. In one or more embodiments, the first angle $\alpha_1$ is in the range of 5 degrees to 20 degrees. Thus, the second angle $\alpha_2$ between the sliding rails 12 of the two partition plate modules 10 is in the range of 10 degrees to 40 degrees. In one or more embodiments, the first angle $\alpha_1$ is 10 degrees or 15 degrees to maintain the stability of the sliding rails 12 with respect to the partition plate 11, and to maximize the second angle $\alpha_2$ to facilitate quick installation and removal of the single hard disk 2.

It can be understood that the sliding wall 122 can drive the sliding rail body 121 to rotate by a first angle di towards one side of the partition plate body 111 by the guiding slope 125 abutting against the sliding rail guide slot 112, and the sliding rails 12 on the left and right sides is opened towards each side by a first angle 1. Thus, the first angle $\alpha_1$ opened by a total of two times to the two sides in the middle of the two sliding rails 12 is a second angle $\alpha_2$. If the sliding rail 12 is made of a hard material and the second angle $\alpha_2$ is equal to twice the first angle $\alpha_1$.

In one or more embodiments, the sliding rail 12 is made of a flexible resilient material and the second angle $\alpha_2$ is greater than or equal to twice the first angle $\alpha_1$. In one or more embodiments, the sliding rails 12 are made of a plastic material that is flexible and resilient, such that after the two sliding rails 12 are coextensive at a second angle $\alpha_2$, the sliding rails 12 may be further bent at the two sides to increase the second angle $\alpha_2$. Thus, the second angle $\alpha_2$ is greater than twice the first angle $\alpha_1$.

As shown in FIGS. 9, 10, 14 and 15, in the present embodiment, the inner end of the sliding rail body 121 has a wedge-shaped structure. A flipping slope 126 is provided at a side of the inner end of the sliding rail body 121 facing towards the partition plate body 111. The angle of the flipping slope 126 with respect to the extension plane of the sliding rail body 121 is a third angle which is greater than or equal to the first angle $\alpha_1$. The flipping slope 126 facilitates the sliding wall 122 being able to rotate the sliding rail body 121 towards a side of the partition plate body 111 by a first angle $\alpha_1$ by the guide slope 125 abutting the sliding rail guide slot 112.

In the present embodiment, the widths of the upper and lower side walls of a side of the inner end of the sliding rail body 121 facing away from the outer end are gradually reduced, whereby the inner end of the sliding rail body 121 has a wedge-shaped structure to facilitate the alignment assembly of the sliding rail 12 with the partition plate 11.

As shown in FIG. 10, a light guide post 127 is further provided at at least one side of the sliding rail body 121 facing towards the partition plate body 111. The light guide post 127 can provide a light source when the sliding rail body 121 is drawn out, whereby the fixed position of the hard disk 2 can be easily seen.

As shown in FIGS. 10 and 15, in the present embodiment, the inner end of the sliding rail body 121 is provided with a hollowed-out groove 128. The elastic wall 124 is located in the hollowed-out groove 128 and is connected to the inner end of the sliding rail body 121. The elastic wall 124 protrudes beyond the surface of the side wall of the sliding rail body 121 towards a side of the partition plate body 111. It is precisely because the elastic wall 124 protrudes beyond the surface of the side wall of the sliding rail body 121 that the elastic wall 124 is received and clamped in the elastic wall sliding slot 113, and the elastic wall 124 is slidably connected along the elastic wall sliding slot 113.

As shown in FIG. 6, FIG. 8, FIG. 11 and FIG. 13, when each of the partition plate modules 10 is in a stretched state, after the sliding rail 12 is pulled out from the partition plate 11 by a maximum distance, it can be realized that the sliding wall 122 can rotate the sliding rail body 121 towards a side of the partition plate body 111 by a first angle $\alpha_1$ by abutting the sliding rail guide slot 112 with the guiding slope 125. In one or more embodiments, when the elastic wall 124 is located on a side of the outer end of the partition plate body 111, the elastic wall 124 abuts against the outer end located at the end of the elastic wall sliding slot 113 when the elastic wall 124 is located within the elastic wall sliding slot 113 and the sliding wall 122 is located within the sliding rail guide slot 112 to allow the sliding rails 12 to be mounted to the partition plate 11. Only the sliding wall 122 can rotate the sliding rail body 121 towards a side of the partition plate body 111 by a first angle di by the guiding slope 125 abutting the sliding rail guide slot 112, whereby a second angle $\alpha_2$ can be opened between the sliding rails 12 of the two partition plate modules 10 without separating the sliding rail 12 from the partition plate 11 so as to fix or detach the hard disk 2 between the two partition plate modules 10.

Figure 17:
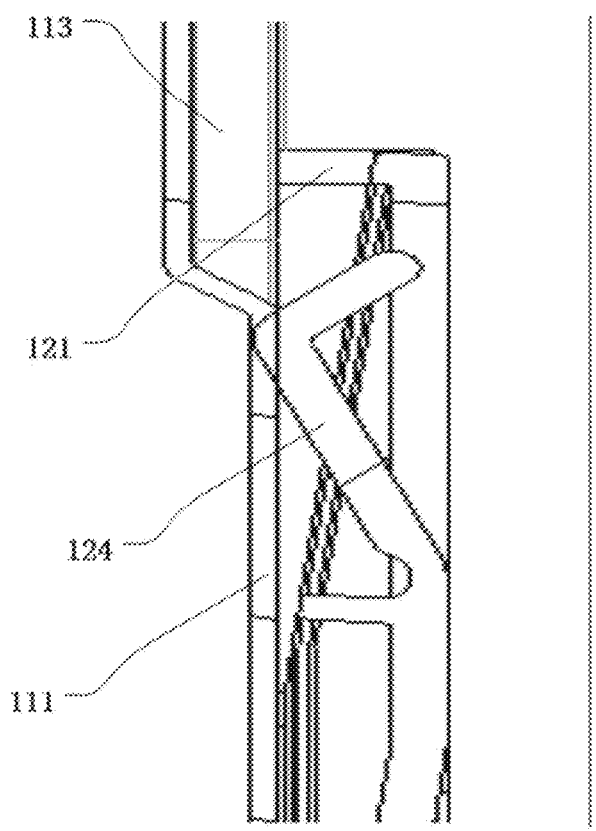
FIG. 17 is a schematic view of a structure according to an embodiment of the present application in which a sliding slot of an elastic wall of the partition plate is not engaged when the elastic wall of the sliding rail is compressed and deformed during the mounting or dismounting of the sliding rail and the partition plate.
Figure 18:
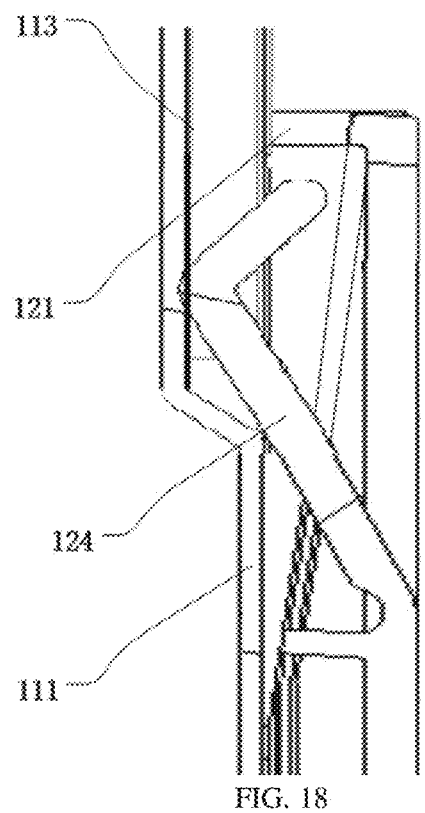
FIG. 18 is a schematic view of a structure according to the embodiment of the present application when the elastic wall of the sliding rail and the elastic wall sliding slot of the partition plate are engaged after the sliding rail and the partition plate are completely installed.

As shown in FIGS. 17 and 18, the sliding rail 12 and the partition plate 11 can be mounted or dismounted. When the sliding rail 12 and the partition plate 11 are mounted, the sliding rail 12 is mounted on the partition plate 11 by pressing and deforming the elastic wall 124 and the partition plate body 111 to slide the elastic wall 124 into the elastic wall sliding slot 113. When the sliding rail 12 is detached from the partition plate 11, the sliding rail 12 is detached from the partition plate 11 by pressing and deforming the elastic wall 124 after being disengaged from the elastic wall sliding slot 113. In one or more embodiments, when the sliding rail 12 is mounted on the partition plate 11, the sliding wall 122 is clamped with the sliding rail guide slot 112 and slides relative to each other, and the elastic wall 124 is pressed and deformed with the partition plate body 111 until the elastic wall 124 is accommodated and clamped in the elastic wall sliding slot 113, and the elastic wall 124 is elastically recovered. When the sliding rail 12 is detached from the partition plate 11, the sliding wall 122 slides relative to the sliding rail guide slot 112, the elastic wall 124 is disengaged from the elastic wall sliding slot 113, and the elastic wall 124 is pressed and deformed against the partition plate body 111 until the sliding wall 122 is disengaged from the sliding rail guide slot 112, and the elastic wall 124 is elastically recovered.

As shown in FIGS. 8 and 13, in the present embodiment, the sliding rail guide slot 112 includes at least one flap guide slot 114 formed by two oppositely disposed L-shaped flaps 115 stamped and formed from the partition plate body 111. In this way, the L-shaped flap 115 is integrally provided with the partition plate body 111, whereby the structure is stable, and the material of the partition plate body 111 is fully utilized, resulting in that the overall weight is reduced, and the overall structure is lightweight.

As shown in FIGS. 8 and 13, in the present embodiment, the sliding rail guide slot 112 includes two flap guide slots 114, which are located at the inner end and the outer end of the slide body 121, respectively. The provision of a plurality of flap guide slots 114 in the form of sliding rail guide slots 112 allows full use of the material of the partition plate body 111, reducing the overall weight and making the overall structure lightweight.

In the present embodiment, the sliding wall 122 has a thickness value equal to the bending width value of the L-shaped flap 115, and the sliding wall 122 protrudes from the upper and lower side wall surfaces of the sliding rail body 121 and is slidably clamped with the L-shaped flap 115.

As shown in FIGS. 8 and 13, in the present embodiment, the partition plate body 111 is provided with a plurality of mounting holes 116 adapted to pass through fasteners to fixedly connect the partition plate body 111 with the chassis support 3. The partition plate 11 is fixedly connected to the chassis support 3 by means of fasteners.

Figure 16:
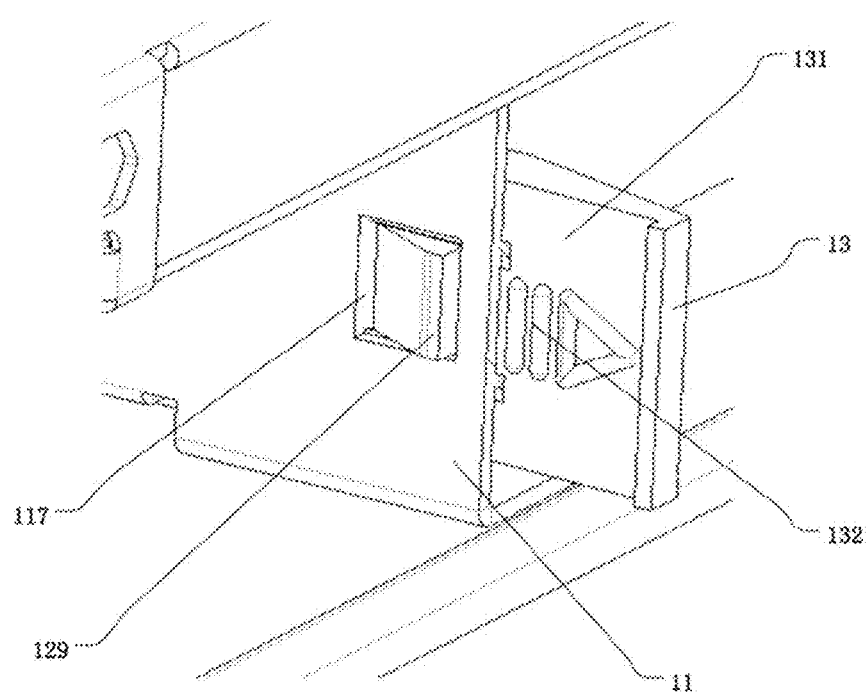
FIG. 16 is a structurally schematic view of a sliding rail locking piece in an embodiment of the present application when being clamped in a lock sliding rail notch.

In the present embodiment, as shown in FIGS. 10, 15 and 16, the sliding rail body 121 is provided at the outer end thereof with a sliding rail locking piece 129. As shown in FIGS. 13 and 16, the partition plate body 111 is provided with a lock sliding rail notch 117. As shown in FIG. 16, when the elastic wall 124 is located at one side of the inner end of the partition plate body 111, the sliding rail locking piece 129 is clamped in the lock sliding rail notch 117, so as to prevent the sliding rail 12 from sliding relative to the partition plate body 11, and ensure that the hard disk 2 is stably fixed in the chassis support 3.

As shown in FIGS. 9, 10, 14, 15 and 16, in the present embodiment, a press unlocking piece 13 is further provided at the outer end of the sliding rail body 121, and the press unlocking piece 13 is connected to the sliding rail locking piece 129. When the press unlocking piece 13 is pressed, the sliding rail locking piece 129 can be caused to disengage from the lock sliding rail notch 117.

As shown in FIG. 16, in the present embodiment, the press unlocking piece 13 includes a finger press plate 131 connected to the sliding rail locking piece 129. The finger press plate 131 is provided with an anti-slip unlocking pattern 132. By pressing the finger press plate 131, the sliding rail locking piece 129 can be driven to be disengaged from the lock sliding rail notch 117, and the anti-slip unlocking pattern 132 can prevent the finger from being slidingly disengaged from the finger press plate 131.

In the present embodiment, when the elastic wall 124 is located on a side of the inner end of the partition plate body 111, the hard disk 2 is received in an engagement slot formed in the chassis support 3, and the finger press plate 131 protrudes out of the engagement slot formed in the chassis support 3. The finger press plate 131 protrudes outside the engagement slot formed by the chassis support 3 so as to facilitate the separation of the sliding rail 12 from the partition plate 11 by pressing the finger press plate 131 with a finger, whereby the hard disk 2 can be pulled out from the chassis support 3 by further pulling the finger press plate 131.

As shown in FIGS. 9 and 14, in the present embodiment, the hard disk fixing structure 123 includes a fixing post. A clamping hole (not shown) is provided on a side wall of the hard disk 2, and the fixing post can be clamped in the clamping hole. In the present application, a plurality of fixing posts are provided, at least two clamping holes are provided on the side wall of the hard disk 2, and stable clamping of the hard disk 2 is achieved by matching the same number of fixing posts as the clamping holes.

In the present embodiment, when the sliding rails 12 of the two partition plate modules 10 are arranged in parallel, the distance between the sliding rail bodies 121 is equal to the width value of the hard disk 2, whereby the hard disk 2 can be clamped exactly between the two partition plate modules 10.

According to the above-mentioned pull-out hard disk bracket, by means of configuring each partition plate module to include a partition plate and a sliding rail, a hard disk is detachably clamped and fixed between two partition plate modules which are arranged in mirror symmetry, and a sliding rail guide slot and a sliding wall, which are arranged so as to cooperatively slide relative to one another, are provided between the sliding rail and the partition plate, such that the sliding rail guide slot and the sliding wall slide relative to one another; a guiding slope is disposed on an end of the sliding wall which is adjacent to a side of an elastic wall, whereby the sliding wall may abut against the sliding rail guide slot by means of the guiding slope to drive a sliding rail body to rotate towards a side of a partition plate body by a first angle; and a second angle $\alpha_2$ is opened between sliding rails of the two partition plate modules, so as to fix or detach the hard disk between the two partition plate modules. The structure of the partition plate modules in the present application is simple and stable clamping of a partition plate and a sliding rail may be achieved by means of cooperation between an elastic wall sliding slot and an elastic wall, and the sliding rails of the two partition plate modules may achieve, by means of movable opening, rapid mounting and detachment of a single hard disk.

In the embodiment of the present application, not only all the above-mentioned technical features are included, but also the sliding rail limit structure 14 is provided at the inner end of the sliding rail body 121. When the hard disk fixing structure 123 is fitted with the clamping hole provided on the side wall of the hard disk 2, the hard disk 2 and the pull-out hard disk bracket 1 may shake due to a machining dimension error or due to the short length of the hard disk fixing structure 123. Therewith, the sliding rail limit structure 14 is further provided to be able to be clamped and fixed with the hard disk 2, so as to achieve a stable fixing function for the hard disk 2.

In one or more embodiments, as shown in FIGS. 2, 3, 4, and 5, a pull-out hard disk bracket 1 is provided for slidably fixing a hard disk 2 to a chassis support 3. The pull-out hard disk bracket 1 includes two partition plate modules 10 arranged in mirror symmetry, and the hard disk 2 can be detachably clamped and fixed between the two partition plate modules 10.

It can be understood that, as shown in FIGS. 6, 7, 10 and 11, the hard disk 2 is detachably fixed by one partition plate module 10 on the left side and one partition plate module 10 on the right side on both sides of the hard disk 2, respectively, whereby the hard disk 2 can be clamped with the pull-out hard disk bracket 1. Herein, one partition plate module 10 on the left side is arranged in mirror symmetry with one partition plate module 10 on the right side, and the distance between the two partition plate modules 10 is equal to the width of the hard disk 2, whereby the hard disk 2 can be clamped exactly. Herein, FIG. 6 is a structurally schematic view of a partition plate module 10 provided on the left side of a hard disk 2 in a stretched state according to an embodiment of the present application. FIG. 7 is a structurally schematic view of a partition plate module 10 provided on the left side of the hard disk 2 in a contraction state according to an embodiment of the present application. FIG. 10 is a structurally schematic view of a partition plate module 10 arranged on the right side of a hard disk 2 in a stretched state according to an embodiment of the present application. FIG. 11 is a structurally schematic view of a partition plate module 10 provided on the right side of the hard disk 2 in a contraction state according to an embodiment of the present application.

As shown in FIGS. 8, 9, 10, 12, 14 and 15, FIG. 8 is a structurally schematic view of a partition plate 11 of a partition plate module 10 provided on the left side of the hard disk according to an embodiment of the present application. FIGS. 9 and 10 are structurally schematic views of a sliding rail 12 of a partition plate module 10 provided on the left side of the hard disk 2 according to an embodiment of the present application. FIG. 12 is a structurally schematic view of a partition plate 11 of a partition plate module 10 provided on the right side of a hard disk 2 according to an embodiment of the present application. FIGS. 14 and 15 are structurally schematic views of a sliding rail 12 of a partition plate module 10 provided on the right side of the hard disk 2 according to an embodiment of the present application.

Herein, each partition plate module 10 includes a partition plate 11 and a sliding rail 12. The partition plate 11 is provided with a partition plate body 111, a sliding rail guide slot 112 and an elastic wall sliding slot 113. The sliding rail guide slot 112 is arranged along the extension direction of the partition plate body 111. The elastic wall sliding slot 113 is located on an axis of symmetry of the sliding rail guide slot 112. The sliding rail 12 is provided with a sliding rail body 121, a sliding wall 122, a hard disk fixing structure 123 and an elastic wall 124. The sliding rail body 121 is provided with an inner end, an outer end, an upper side wall and a lower side wall. The sliding wall 122 is located on the upper side wall and the lower side wall of the sliding rail body 121 and is slidably connected to the sliding rail guide slot 112. The hard disk fixing structure 123 is provided on a side of the sliding rail body 121 facing away from the partition plate body 111 for clamping and fixing the hard disk 2. The elastic wall 124 is provided on a side of the inner end of the sliding rail body 121, and the elastic wall 124 can be slidably clamped in the elastic wall sliding slot 113.

Therewith, both sides of the hard disk 2 are clamped on the sliding rail 12, and the sliding rail 12 can slide along the partition plate 11, whereby detachable clamping and fixing of the partition plate module 10 and the hard disk 2 can be realized. When the two partition plates 11 are mounted on the chassis support 3, fixing or dismounting of the hard disk 2 on the chassis support 3 can be realized by means of pulling and pulling the hard disk 2. A sliding rail guide slot 112 and a sliding wall 122 which are in relative sliding fit are provided between the sliding rail 12 and the sliding plate 11 to achieve relative sliding of the two, so as to achieve that the structure of the sliding plate module 10 in the present application is simple, and a stable clamping connection between the sliding plate 11 and the sliding rail 12 can be achieved by means of the fitting of the elastic wall sliding slot 113 and the elastic wall 124, thus ensuring the stability of the structure.

As shown in FIGS. 9, 10, 14 and 15, the end of the sliding wall 122 adjacent to one side of the elastic wall 124 is provided with a guiding slope 125. When the elastic wall 124 is located on a side of the outer end of the partition plate body 111, the elastic wall 124 abuts against an end of the elastic wall sliding slot 113, and the sliding wall 122 can move the sliding rail body 121 to rotate by a first angle $\alpha_1$ towards a side of the partition plate body 111 by abutting against the sliding rail guide slot 112 via the guiding slope 125, and expand by a second angle $\alpha_2$ between the sliding rails 12 of the two partition plate modules 10 so as to fix or detach the hard disk 2 between the two partition plate modules 10.

In the present embodiment, the guiding slope 125 is provided at the end of the sliding wall 122 adjacent to the side of the elastic wall 124, whereby the sliding wall 122 can rotate the sliding rail body 121 towards the side of the partition plate body 111 by the abutment of the guiding slope 125 with the sliding rail guide slot 112 by a first angle $\alpha_1$, and expand between the sliding rails 12 of the two partition plate modules 10 by a second angle $\alpha_2$ so as to fix or detach the hard disk 2 between the two partition plate modules 10. By means of pulling the hard disk 2, it is achieved that the sliding rails 12 of the two partition plate modules 10 can be movably opened to realize the quick installation and removal of the single hard disk 2.

In the present embodiment, the second angle $\alpha_2$ is equal to twice the first angle $\alpha_1$. In one or more embodiments, the first angle $\alpha_1$ is in the range of 5 degrees to 20 degrees. Thus, the second angle $\alpha_2$ between the sliding rails 12 of the two partition plate modules 10 is in the range of 10 degrees to 40 degrees. In one or more embodiments, the first angle $\alpha_1$ is 10 degrees or 15 degrees to maintain the stability of the sliding rails 12 with respect to the partition plate 11, and to maximize the second angle $\alpha_2$ to facilitate quick installation and removal of the single hard disk 2.

It can be understood that the sliding wall 122 can drive the sliding rail body 121 to rotate by a first angle $\alpha_1$ towards one side of the partition plate body 111 by the guiding slope 125 abutting against the sliding rail guide slot 112, and the sliding rails 12 on the left and right sides is opened towards each side by a first angle $\alpha_1$. Thus, the first angle $\alpha_1$ opened by a total of two times to the two sides in the middle of the two sliding rails 12 is a second angle $\alpha_2$. If the sliding rail 12 is made of a hard material and the second angle $\alpha_2$ is equal to twice the first angle $\alpha_1$.

In another embodiment, the sliding rail 12 is made of a flexible resilient material and the second angle $\alpha_2$ is greater than or equal to twice the first angle «1. In one or more embodiments, the sliding rails 12 are made of a plastic material that is flexible and resilient, such that after the two sliding rails 12 are coextensive at a second angle $\alpha_2$, the sliding rails 12 may be further bent at the two sides to increase the second angle $\alpha_2$. Thus, the second angle $\alpha_2$ is greater than twice the first angle $\alpha_1$.

As shown in FIGS. 9, 10, 14 and 15, in the present embodiment, the inner end of the sliding rail body 121 has a wedge-shaped structure. A flipping slope 126 is provided at a side of the inner end of the sliding rail body 121 facing towards the partition plate body 111. The angle of the flipping slope 126 with respect to the extension plane of the sliding rail body 121 is a third angle which is greater than or equal to the first angle $\alpha_1$. The flipping slope 126 facilitates the sliding wall 122 being able to rotate the sliding rail body 121 towards a side of the partition plate body 111 by a first angle $\alpha_1$ by the guide slope 125 abutting the sliding rail guide slot 112.

In the present embodiment, the widths of the upper and lower side walls of a side of the inner end of the sliding rail body 121 facing away from the outer end are gradually reduced, whereby the inner end of the sliding rail body 121 has a wedge-shaped structure to facilitate the alignment assembly of the sliding rail 12 with the partition plate 11.

As shown in FIG. 10, a light guide post 127 is further provided at at least one side of the sliding rail body 121 facing towards the partition plate body 111.

As shown in FIGS. 10 and 15, in the present embodiment, the inner end of the sliding rail body 121 is provided with a hollowed-out groove 128. The elastic wall 124 is located in the hollowed-out groove 128 and is connected to the inner end of the sliding rail body 121. The elastic wall 124 protrudes beyond the surface of the side wall of the sliding rail body 121 towards a side of the partition plate body 111. It is precisely because the elastic wall 124 protrudes beyond the surface of the side wall of the sliding rail body 121 that the elastic wall 124 is received and clamped in the elastic wall sliding slot 113, and the elastic wall 124 is slidably connected along the elastic wall sliding slot 113.

As shown in FIG. 6, FIG. 8, FIG. 11 and FIG. 13, when each of the partition plate modules 10 is in a stretched state, after the sliding rail 12 is pulled out from the partition plate 11 by a maximum distance, it can be realized that the sliding wall 122 can rotate the sliding rail body 121 towards a side of the partition plate body 111 by a first angle $\alpha_1$ by abutting the sliding rail guide slot 112 with the guiding slope 125. In one or more embodiments, when the elastic wall 124 is located on a side of the outer end of the partition plate body 111, the elastic wall 124 abuts against the outer end located at the end of the elastic wall sliding slot 113 when the elastic wall 124 is located within the elastic wall sliding slot 113 and the sliding wall 122 is located within the sliding rail guide slot 112 to allow the sliding rails 12 to be mounted to the partition plate 11. Only the sliding wall 122 can rotate the sliding rail body 121 towards a side of the partition plate body 111 by a first angle 1 by the guiding slope 125 abutting the sliding rail guide slot 112, whereby a second angle $\alpha_2$ can be opened between the sliding rails 12 of the two partition plate modules 10 without separating the sliding rail 12 from the partition plate 11 so as to fix or detach the hard disk 2 between the two partition plate modules 10.

Figure 19:
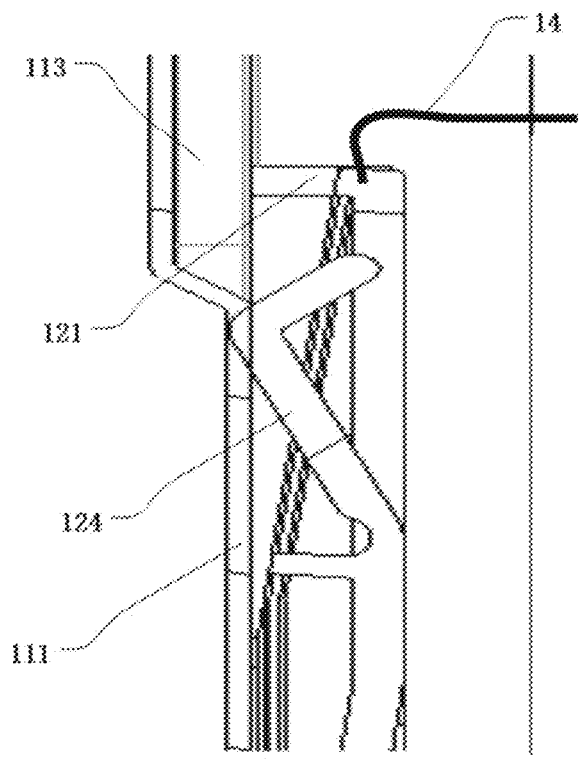
FIG. 19 is a schematic view of a structure according to an embodiment of the present application in which a sliding slot of an elastic wall of the partition plate is not engaged when the elastic wall of the sliding rail is compressed and deformed during the mounting or dismounting of the sliding rail and the partition plate.
Figure 20:
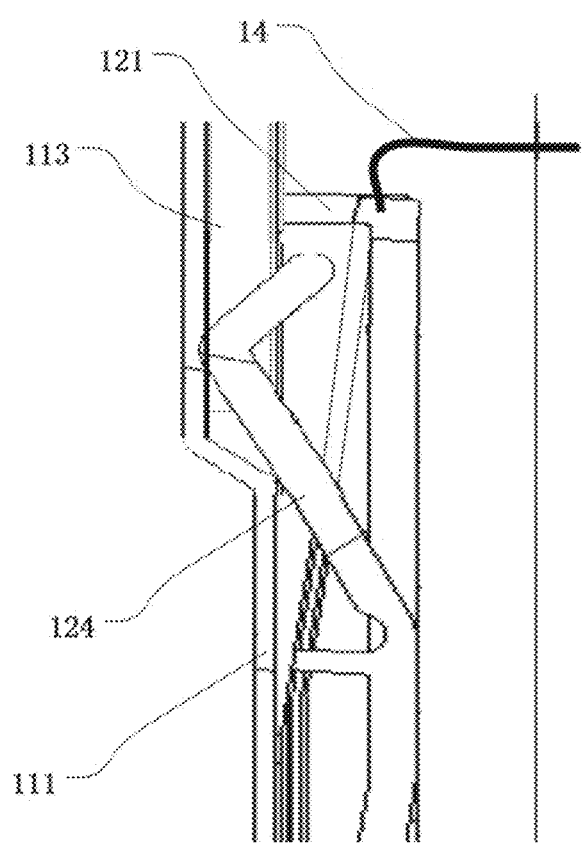
FIG. 20 is a schematic view of a structure according to the embodiment of the present application when the elastic wall of the sliding rail and the elastic wall sliding slot of the partition plate are engaged after the sliding rail and the partition plate are completely installed.

As shown in FIGS. 19 and 20, the sliding rail 12 and the partition plate 11 can be mounted or dismounted. When the sliding rail 12 and the partition plate 11 are mounted, the sliding rail 12 is mounted on the partition plate 11 by pressing and deforming the elastic wall 124 and the partition plate body 111 to slide the elastic wall 124 into the elastic wall sliding slot 113. When the sliding rail 12 is detached from the partition plate 11, the sliding rail 12 is detached from the partition plate 11 by pressing and deforming the elastic wall 124 after being disengaged from the elastic wall sliding slot 113. In one or more embodiments, when the sliding rail 12 is mounted on the partition plate 11, the sliding wall 122 is clamped with the sliding rail guide slot 112 and slides relative to each other, and the elastic wall 124 is pressed and deformed with the partition plate body 111 until the elastic wall 124 is accommodated and clamped in the elastic wall sliding slot 113, and the elastic wall 124 is elastically recovered. When the sliding rail 12 is detached from the partition plate 11, the sliding wall 122 slides relative to the sliding rail guide slot 112, the elastic wall 124 is disengaged from the elastic wall sliding slot 113, and the elastic wall 124 is pressed and deformed against the partition plate body 111 until the sliding wall 122 is disengaged from the sliding rail guide slot 112, and the elastic wall 124 is elastically recovered.

As shown in FIGS. 8 and 13, in the present embodiment, the sliding rail guide slot 112 includes at least one flap guide slot 114 formed by two oppositely disposed L-shaped flaps 115 stamped and formed from the partition plate body 111. In this way, the L-shaped flap 115 is integrally provided with the partition plate body 111, whereby the structure is stable, and the material of the partition plate body 111 is fully utilized, resulting in that the overall weight is reduced, and the overall structure is lightweight.

As shown in FIGS. 8 and 13, in the present embodiment, the sliding rail guide slot 112 includes two flap guide slots 114, which are located at the inner end and the outer end of the slide body 121, respectively. The provision of a plurality of flap guide slots 114 in the form of sliding rail guide slots 112 allows full use of the material of the partition plate body 111, reducing the overall weight and making the overall structure lightweight.

In the present embodiment, the sliding wall 122 has a thickness value equal to the bending width value of the L-shaped flap 115, and the sliding wall 122 protrudes from the upper and lower side wall surfaces of the sliding rail body 121 and is slidably clamped with the L-shaped flap 115.

As shown in FIGS. 19 and 20, in the present embodiment, the sliding rail limit structure 14 is further provided at the inner end of the sliding rail body 121. The sliding rail limit structure 14 is capable of ensuring the relative position of the hard disk 2. When the hard disk fixing structure 123 is fitted with the clamping hole provided on the side wall of the hard disk 2, the sliding rail limit structure 14 can abut against the side wall of the hard disk 2, and together achieve stable fixing of the hard disk 2 on the pull-out hard disk bracket 1. Even if there is a matching gap between the pull-out hard disk bracket 1 and the hard disk 2, a stable fixing of the hard disk 2 can be achieved by means of the sliding rail limit structure 14.

It can be understood that, in one or more embodiments, an elastic connecting plate (not shown) is provided between the sliding rail limit structures 14 of the two slide bodies 121, with both ends of the elastic connecting plate being connected to the sliding rail limit structures 14 of the two slide bodies 121 to connect the two sliding rails 12 together as a single unit. This prevents the inner end of the hard disk 2 from disengaging from the sliding rail limit structure 14. In one or more embodiments, the flexible resilient material used for the elastic connecting plate is plastic.

As shown in FIGS. 8 and 13, in the present embodiment, the partition plate body 111 is provided with a plurality of mounting holes 116 adapted to pass through fasteners to fixedly connect the partition plate body 111 with the chassis support 3. The partition plate 11 is fixedly connected to the chassis support 3 by means of fasteners.

In the present embodiment, as shown in FIGS. 10, 14, 15 and 16, the sliding rail body 121 is provided at the outer end thereof with a sliding rail locking piece 129. As shown in FIGS. 13 and 16, the partition plate body 111 is provided with a lock sliding rail notch 117. As shown in FIG. 16, when the elastic wall 124 is located at one side of the inner end of the partition plate body 111, the sliding rail locking piece 129 is clamped in the lock sliding rail notch 117, so as to prevent the sliding rail 12 from sliding relative to the partition plate body 11, and ensure that the hard disk 2 is stably fixed in the chassis support 3.

As shown in FIGS. 9, 10, 14, 15 and 16, in the present embodiment, a press unlocking piece 13 is further provided at the outer end of the sliding rail body 121, and the press unlocking piece 13 is connected to the sliding rail locking piece 129. When the press unlocking piece 13 is pressed, the sliding rail locking piece 129 can be caused to disengage from the lock sliding rail notch 117.

As shown in FIG. 16, in the present embodiment, the press unlocking piece 13 includes a finger press plate 131 connected to the sliding rail locking piece 129. The finger press plate 131 is provided with an anti-slip unlocking pattern 132. By pressing the finger press plate 131, the sliding rail locking piece 129 can be driven to be disengaged from the lock sliding rail notch 117, and the anti-slip unlocking pattern 132 can prevent the finger from being slidingly disengaged from the finger press plate 131.

In the present embodiment, when the elastic wall 124 is located on a side of the inner end of the partition plate body 111, the hard disk 2 is received in an engagement slot formed in the chassis support 3, and the finger press plate 131 protrudes out of the engagement slot formed in the chassis support 3. The finger press plate 131 protrudes outside the engagement slot formed by the chassis support 3 so as to facilitate the separation of the sliding rail 12 from the partition plate 11 by pressing the finger press plate 131 with a finger, whereby the hard disk 2 can be pulled out from the chassis support 3 by further pulling the finger press plate 131.

As shown in FIGS. 9 and 14, in the present embodiment, the hard disk fixing structure 123 includes a fixing post. A clamping hole is provided on the side wall of the hard disk 2, and the fixing post can be clamped in the clamping hole. In the present application, a plurality of fixing posts are provided, at least two clamping holes are provided on the side wall of the hard disk 2, and stable clamping of the hard disk 2 is achieved by matching the same number of fixing posts as the clamping holes.

In the present embodiment, when the sliding rails 12 of the two partition plate modules 10 are arranged in parallel, the distance between the sliding rail bodies 121 is equal to the width value of the hard disk 2, whereby the hard disk 2 can be clamped exactly between the two partition plate modules 10.

According to the above-mentioned pull-out hard disk bracket, by means of configuring each partition plate module to include a partition plate and a sliding rail, a hard disk is detachably clamped and fixed between two partition plate modules which are arranged in mirror symmetry, and a sliding rail guide slot and a sliding wall, which are arranged so as to cooperatively slide relative to one another, are provided between the sliding rail and the partition plate, such that the sliding rail guide slot and the sliding wall slide relative to one another; a guiding slope is disposed on an end of the sliding wall which is adjacent to a side of an elastic wall, whereby the sliding wall may abut against the sliding rail guide slot by means of the guiding slope to drive a sliding rail body to rotate towards a side of a partition plate body by a first angle; and a second angle is opened between sliding rails of the two partition plate modules, so as to fix or detach the hard disk between the two partition plate modules. The structure of the partition plate modules in the present application is simple and stable clamping of a partition plate and a sliding rail may be achieved by means of cooperation between an elastic wall sliding slot and an elastic wall, and the sliding rails of the two partition plate modules may achieve, by means of movable opening, rapid mounting and detachment of a single hard disk.

Embodiments of the present application also provide a method for fixing a hard disk 2 by a pull-out hard disk bracket 1, wherein the pull-out hard disk bracket 1 is configured for being mounted on a chassis support 3, and the hard disk 2 can be slidably fixed on the chassis support 3 on the inner side of the pull-out hard disk bracket 1. The pull-out hard disk bracket 1 used in the embodiment of the present application is specifically described with reference to the foregoing, and will not be described in detail.

Figure 21:
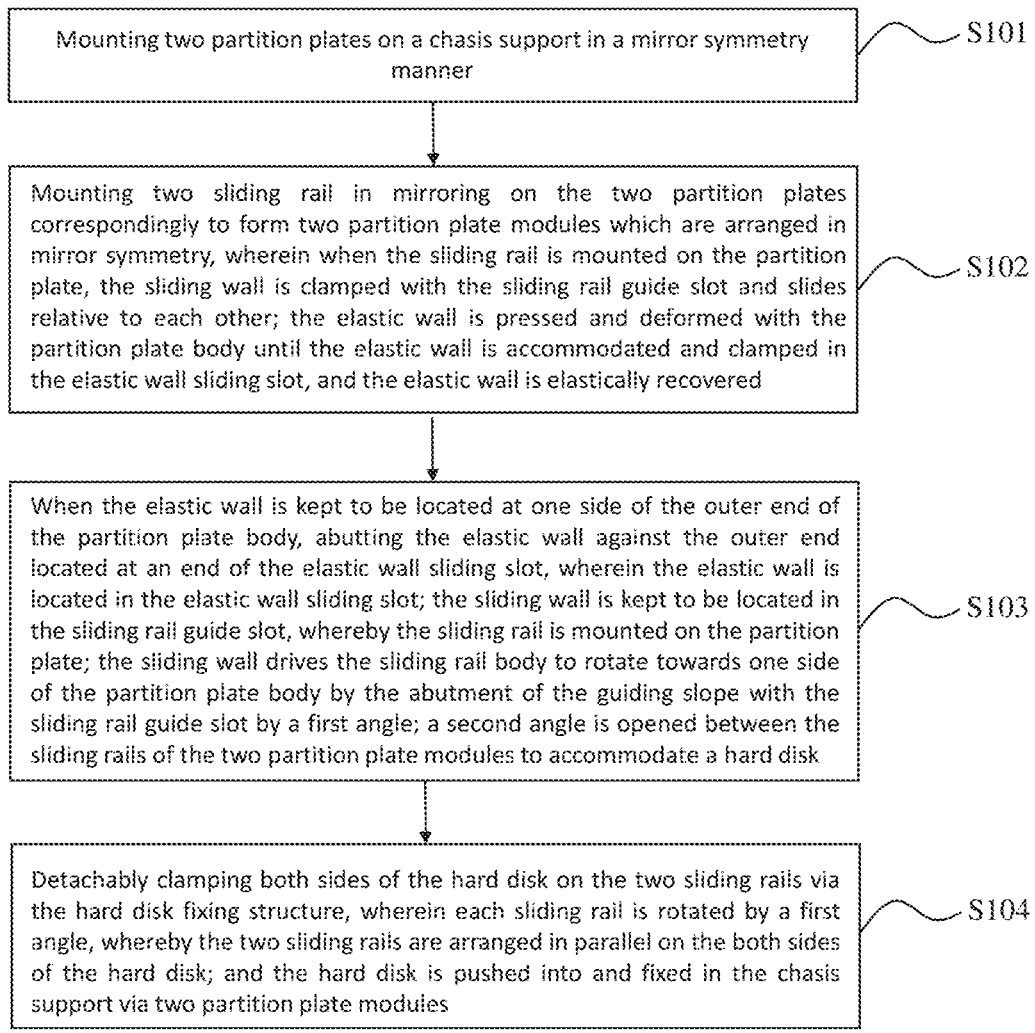
FIG. 21 is a flow chart showing a method for fixing a hard disk by a pull-out hard disk bracket according to an embodiment of the present application.

As shown in FIG. 21, the method for fixing a hard disk by a pull-out hard disk bracket according to an embodiment of the present application includes the steps below:

step S101, two partition plates are mounted on the chassis support in a mirror symmetry manner;

step S102, two sliding rail are mounted in mirroring on the two partition plates correspondingly to form two partition plate modules which are arranged in mirror symmetry, wherein when the sliding rail is mounted on the partition plate, the sliding wall is clamped with the sliding rail guide slot and slides relative to each other; the elastic wall is pressed and deformed with the partition plate body until the elastic wall is accommodated and clamped in the elastic wall sliding slot, and the elastic wall is elastically recovered;

step S103, when the elastic wall is kept to be located at one side of the outer end of the partition plate body, the elastic wall abuts against the outer end located at an end of the elastic wall sliding slot, wherein the elastic wall is located in the elastic wall sliding slot; the sliding wall is kept to be located in the sliding rail guide slot, whereby the sliding rail is mounted on the partition plate; the sliding wall drives the sliding rail body to rotate towards one side of the partition plate body by the abutment of the guiding slope with the sliding rail guide slot by a first angle; a second angle is opened between the sliding rails of the two partition plate modules to accommodate a hard disk; and step S104, both sides of the hard disk are detachably clamped on the two sliding rails via the hard disk fixing structure, wherein each sliding rail is rotated by a first angle, whereby the two sliding rails are arranged in parallel on the both sides of the hard disk; and the hard disk is pushed into and fixed in the chassis support via two partition plate modules.

Figure 22:
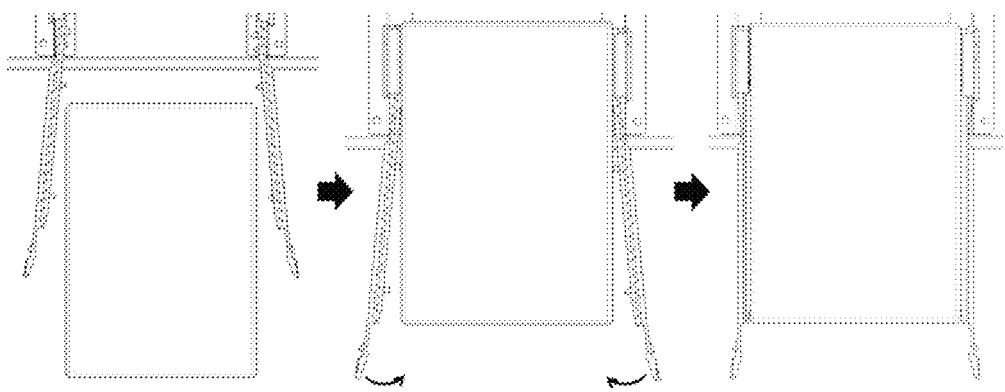
FIG. 22 is a schematic diagram of a process for mounting a hard disk on a pull-out hard disk bracket according to an embodiment of the present application.

As shown in FIG. 22, the method for fixing a hard disk 2 by a pull-out hard disk bracket 1 provided in an embodiment of the present application includes the steps below:

two partition plates 11 are mounted on the chassis support 3 in a mirror symmetry manner;

two sliding rail 12 are mounted in mirroring on the two partition plates 11 correspondingly to form two partition plate modules 10 which are arranged in mirror symmetry, wherein when the sliding rail 12 is mounted on the partition plate 11, the sliding wall 122 is clamped with the sliding rail guide slot 112 and slides relative to each other; the elastic wall 124 is pressed and deformed with the partition plate body 111 until the elastic wall 124 is accommodated and clamped in the elastic wall sliding slot 113, and the elastic wall 124 is elastically recovered;

when the elastic wall 124 is kept to be located at a side of the outer end of the partition plate body 111, the elastic wall 124 abuts against the end of the elastic wall sliding slot 113, the sliding wall 122 can move the sliding rail body 121 to rotate by a first angle $\alpha_1$ towards a side of the partition plate body 111 by abutting the guiding slope 125 against the sliding rail guide slot 112, and a second angle $\alpha_2$ is opened between the sliding rails 12 of the two partition plate modules 10 to accommodate a hard disk 2;

both sides of the hard disk 2 are detachably clamped on the two sliding rails 12 via the hard disk fixing structure 123, wherein each sliding rail 12 is rotated by a first angle $\alpha_1$, whereby the two sliding rails 12 are arranged in parallel on the both sides of the hard disk 2; and the hard disk 2 is pushed into and fixed in the chassis support 3 via two partition plate modules 10.

In the present embodiment, the method for fixing the hard disk 2 by the pull-out hard disk bracket 1 further includes the steps below:

the hard disk 2 is pulled out from the chassis support 3 via the two partition plate modules 10, the elastic wall 124 is kept at a side of the outer end of the partition plate body 111, and the elastic wall 124 abuts against the end of the elastic wall sliding slot 113;

two sliding rails 12 at both sides of the hard disk 2 are separated towards a side facing away from the hard disk 2, and the hard disk fixing structure 123 is separated from the hard disk 2; the sliding wall 122 can move the sliding rail body 121 to rotate by a first angle $\alpha_1$ towards a side of the partition plate body 111 by abutting the guiding slope 125 against the sliding rail guide slot 112; and a second angle $\alpha_2$ is opened between the sliding rails 12 of the two partition plate modules 10 so as to fix or detach the hard disk 2 between the two partition plate modules 10.

In the present embodiment, the method for fixing the hard disk 2 by the pull-out hard disk bracket 1 further includes:

the sliding rail 12 is separated from the partition plate 11; when the sliding rail 12 is detached from the partition plate 11, the sliding wall 122 slides relative to the sliding rail guide slot 112, the elastic wall 124 is disengaged from the elastic wall sliding slot 113, and the elastic wall 124 is pressed and deformed against the partition plate body 111 until the sliding wall 122 is disengaged from the sliding rail guide slot 112, and the elastic wall 124 is elastically recovered.

As shown in FIGS. 17, 18, 19, 20 and 22, when the pull-out hard disk bracket 1 is mounted with the hard disk 2, firstly, the partition plates 11 of the two partition plate modules 10 are mirror-symmetrically mounted on the chassis support 3, then the inner ends of the sliding rail bodies 121 of the two sliding rails 12 are respectively aligned with the two sliding rail guide slots 112, and the elastic wall 124 is pressed and deformed against the partition plate body 111 until the elastic wall 124 is received and clamped in the elastic wall sliding slot 113 so as to assemble the sliding rails 12 and the partition plates 11 with each other. Secondly, when the elastic wall 124 is kept to be located at a side of the outer end of the partition plate body 111, the elastic wall 124 abuts against the end of the elastic wall sliding slot 113, the sliding wall 122 can move the sliding rail body 121 to rotate by a first angle di towards a side of the partition plate body 111 by abutting the guiding slope 125 against the sliding rail guide slot 112, and a second angle $\alpha_2$ is opened between the sliding rails 12 of the two partition plate modules 10 to accommodate a hard disk 2. Then, both sides of the hard disk 2 are detachably clamped on the two sliding rails 12 via the hard disk fixing structure 123, wherein each sliding rail 12 is rotated by a first angle $\alpha_1$, whereby the two sliding rails 12 are arranged in parallel on the both sides of the hard disk 2; and the hard disk 2 is pushed into and fixed in the chassis support 3 via two partition plate modules 10. When the hard disk 2 is pushed inwards, the sliding rail 12 is driven to move inwards. When the elastic arm slides into the elastic arm sliding slot of the partition plate 11, the sliding rail 12 is also automatically engaged.

When the hard disk 2 is pushed into the chassis support 3, and the elastic wall 124 is located at a side of the inner end of the partition plate body 111, the elastic wall 124 abuts against the end of the elastic wall sliding slot 113, and the inner end of the sliding rail body 121 abuts against the sliding rail limit structure 14. At this time, the sliding rail locking piece 129 is clamped in the lock sliding rail notch 117, so as to prevent the sliding rail 12 from sliding relative to the partition plate 11, and ensure that the hard disk 2 is stably fixed in the chassis support 3. Only the finger press plate 131 protrudes out of the engagement slot formed by the chassis support 3 on the surface of the chassis support 3.

When it is desired to pull the hard disk 2 out of the chassis support 3, as opposed to the process shown in FIG. 22, the sliding rail locking piece 129 is moved away from the lock sliding rail notch 117 by pressing the finger press plate 131, whereby the sliding rail 12 can slide relative to the partition plate 11. The hard disk 2 is pulled out from the chassis support 3 until the elastic wall 124 is located at a side of the outer end of the partition plate body 111, and the elastic wall 124 abuts against the end of the elastic wall sliding slot 113. At this time two sliding rails 12 at both sides of the hard disk 2 are separated by force towards a side facing away from the hard disk 2, and the hard disk fixing structure 123 is separated from the hard disk 2; the sliding wall 122 can move the sliding rail body 121 to rotate by a first angle di towards a side of the partition plate body 111 by abutting the guiding slope 125 against the sliding rail guide slot 112; and a second angle $\alpha_2$ is opened between the sliding rails 12 of the two partition plate modules 10 so as to detach and take out the hard disk 2 between the two partition plate modules 10.

If the sliding rail 12 is damaged, it is necessary to replace the sliding rail 12. When the sliding rail 12 is detached from the partition plate 11, the sliding wall 122 slides relative to the sliding rail guide slot 112, the elastic wall 124 is disengaged from the elastic wall sliding slot 113, and the elastic wall 124 is pressed and deformed against the partition plate body 111 until the sliding wall 122 is disengaged from the sliding rail guide slot 112, and the elastic wall 124 is elastically recovered.

According to the above-mentioned method for fixing the hard disk by the pull-out hard disk bracket, by means of configuring each partition plate module to include a partition plate and a sliding rail, a hard disk is detachably clamped and fixed between two partition plate modules which are arranged in mirror symmetry, and a sliding rail guide slot and a sliding wall, which are arranged so as to cooperatively slide relative to one another, are provided between the sliding rail and the partition plate, such that the sliding rail guide slot and the sliding wall slide relative to one another; a guiding slope is disposed on an end of the sliding wall which is adjacent to a side of an elastic wall, whereby the sliding wall may abut against the sliding rail guide slot by means of the guiding slope to drive a sliding rail body to rotate towards a side of a partition plate body by a first angle; and a second angle is opened between sliding rails of the two partition plate modules, so as to fix or detach the hard disk between the two partition plate modules. The structure of the partition plate modules in the present application is simple and stable clamping of a partition plate and a sliding rail may be achieved by means of cooperation between an elastic wall sliding slot and an elastic wall, and the sliding rails of the two partition plate modules may achieve, by means of movable opening, rapid mounting and detachment of a single hard disk.

The present application discloses a solution for quickly mounting/detaching a bare hard disk, which has no structural parts other than the hard disk and is very simple in structure compared with a conventional hard disk bracket. The hard disk bracket is saved and part of the function of the hard disk bracket is realized. This design can also avoid the problem of hard disk sliding rail missing in the form of related accessories, which can be used in a wide range of applications as long as the components or modules are inserted and connected, such as tape drives and CD-ROM drives in data centers.

Thus, the pull-out hard disk bracket structure described above is not only suitable for hard disks, such as tape drives for data centers, optical drives, and a variety of plug-in mounted components or modules, but also can be easily and quickly assembled/detached using such a low-cost solution. Also, it is not limited in its implementation to a resilient arm, such as by providing spring force with a spring.

The technical features of the above-mentioned embodiments can be combined in any combination. In order to make the description concise, not all the possible combinations of the technical features in the above-mentioned embodiments are described. However, as long as there is no contradiction between the combinations of the technical features, they should be considered as the scope of disclosure contained in the present description.

The embodiments described above represent only a few implementations of the present application and are described in more detail, but are not to be construed as limiting the scope of the claims of the present application. It should be noted that several variations and modifications can be made by one skilled in the art without departing from the inventive concept of the present application, which is within the scope of the present application. Therewith, the protection scope of the present application is as set forth in the claims below.

What is claimed is:

1. A pull-out hard disk bracket for slidably fixing a hard disk onto a chassis support, comprising two partition plate modules arranged in mirror symmetry, wherein the hard disk can be detachably clamped and fixed between the two partition plate modules;

each of the partition plate modules comprises a partition plate and a sliding rail;

the partition plate comprises a partition plate body, a sliding rail guide slot and an elastic wall sliding slot, wherein the sliding rail guide slot is arranged along an extension direction of the partition plate body, and the elastic wall sliding slot is located on an axis of symmetry of the sliding rail guide slot;

the sliding rail comprises a sliding rail body, a sliding wall, a hard disk fixing structure and an elastic wall, wherein the sliding rail body comprises an inner end, an outer end, an upper side wall and a lower side wall, the sliding wall is located on the upper side wall and the lower side wall of the sliding rail body and is slidably connected to the sliding rail guide slot, the hard disk fixing structure is arranged on a side of the sliding rail body facing away from the partition plate body for clamping and fixing the hard disk, the elastic wall is arranged on one side of the inner end of the sliding rail body, and the elastic wall can be slidingly clamped into the elastic wall sliding slot; and wherein an end of the sliding wall adjacent to one side of the elastic wall is provided with a guiding slope, when the elastic wall is located at one side of an outer end of the partition plate body, the elastic wall abuts against the outer end located at an end of the elastic wall sliding slot, the elastic wall is located in the elastic wall sliding slot, the sliding wall is held within the sliding rail guide slot to mount the sliding rail on the partition plate, and the sliding wall can drive the sliding rail body to rotate towards one side of the partition plate body by abutment of the guiding slope with the sliding rail guide slot by a first angle, forming a second angle between the sliding rails of the two partition plate modules so as to fix or detach the hard disk between the two partition plate modules.

2. The pull-out hard disk bracket according to claim 1, wherein the second angle is equal to twice the first angle.

3. The pull-out hard disk bracket according to claim 1, wherein the sliding rail is made of a flexible resilient material and the second angle is greater than or equal to twice the first angle.

4. The pull-out hard disk bracket according to claim 2, wherein the first angle is in a range of 5 to 20 degrees.

5. The pull-out hard disk bracket according to claim 1, wherein the inner end of the sliding rail body has a wedge-shaped structure, a flipping slope is provided at a side of the inner end of the sliding rail body facing towards the partition plate body.

6. The pull-out hard disk bracket according to claim 5, wherein a hollowed-out groove is provided at the inner end of the sliding rail body, the elastic wall is located in the hollowed-out groove and is connected to the inner end of the sliding rail body, and a side of the elastic wall facing towards the partition plate body protrudes beyond a surface of a side wall of the sliding rail body.

7. The pull-out hard disk bracket according to claim 6, wherein,
when the sliding rail is mounted on the partition plate, the sliding wall is clamped within the sliding rail guide slot and slides relative to the sliding rail guide, the elastic wall and the partition plate body press against each other and deform until the elastic wall is accommodated and clamped into the elastic wall sliding slot, and the elastic wall is elastically recovered; and
when the sliding rail is detached from the partition plate, the sliding wall slides relative to the sliding rail guide slot, the elastic wall is disengaged from the elastic wall sliding slot, and the elastic wall and the partition plate body press against each other and deform until the sliding wall is disengaged from the sliding rail guide slot, and the elastic wall is elastically recovered.

8. The pull-out hard disk bracket according to claim 5, wherein the inner end of the sliding rail body has an upper side wall and a lower side wall at a side facing away from the outer end of the sliding rail body that are gradually reduced in width.

9. The pull-out hard disk bracket according to claim 1, wherein the sliding rail guide slot comprises at least one flap guide slot formed by two oppositely disposed L-shaped flaps.

10. The pull-out hard disk bracket according to claim 9, wherein the at least one flap guide is two flap guide slots located at the inner and outer ends of the sliding rail body, respectively.

11. The pull-out hard disk bracket according to claim 9, wherein,
a thickness value of the sliding wall is equal to a bending width value of one of the two oppositely disposed L-shaped flaps; and
the sliding wall protrudes from upper and lower side wall surfaces of the sliding rail body and is slidably clamped with the one of the two oppositely disposed L-shaped flaps.

12. The pull-out hard disk bracket according to claim 1, wherein when the elastic wall is located at a side of an inner end of the partition plate body, the elastic wall abuts against the outer end located at the end of the elastic wall sliding slot, the elastic wall is located within the elastic wall sliding slot, and the inner end of the sliding rail body abuts against a sliding rail limit structure.

13. The pull-out hard disk bracket according to claim 1, wherein the partition plate body is provided with a plurality of mounting holes adapted to pass through fasteners to fixedly connect the partition plate body to the chassis support.

14. The pull-out hard disk bracket according to claim 1, wherein a sliding rail locking piece is snapped into a lock sliding rail notch when the elastic wall is located at a side of an inner end of the partition plate body.

15. The pull-out hard disk bracket according to claim 14, wherein,
a press unlocking piece is further provided at the outer end of the sliding rail body, and the press unlocking piece is connected to the sliding rail locking piece; and
when the press unlocking piece is pressed, the sliding rail locking piece is capable of being driven to be disengaged from the lock sliding rail notch.

16. The pull-out hard disk bracket according to claim 15, wherein,
the press unlocking piece comprises a finger press plate which is connected to the sliding rail locking piece; and
an anti-slip unlocking pattern is arranged on the finger press plate.

17. The pull-out hard disk bracket according to claim 16, wherein the hard disk is received in an engagement slot formed in the chassis support when the elastic wall is located at a side of the inner end of the partition plate body, and the finger press plate protrudes out of the engagement slot formed in the chassis support.

18. The pull-out hard disk bracket according to claim 1, wherein the hard disk fixing structure comprises a fixing post, a side wall of the hard disk is provided with a clamping hole, and the fixing post is capable of being clamped into the clamping hole.

19. The pull-out hard disk bracket according to claim 1, wherein when the sliding rails of the two partition plate modules are arranged in parallel, a spacing between the two sliding rail bodies is equal to a width value of the hard disk.

20. The pull-out hard disk bracket according to claim 1, wherein,
a sliding rail limit structure is further arranged at a position of the inner end of the sliding rail body, the sliding rail limit structure is arranged corresponding to the elastic wall sliding slot;
a sliding rail locking piece is arranged at the outer end of the sliding rail body, and the partition plate body is provided with a lock sliding rail notch; and
a light guide post is further provided at at least one side of the sliding rail body facing towards the partition plate body.

* * * * *